US007611411B2

(12) United States Patent
Griswold et al.

(10) Patent No.: US 7,611,411 B2
(45) **Date of Patent: *Nov. 3, 2009**

(54) PLAYER TRACKING INSTRUMENTS HAVING MULTIPLE COMMUNICATION MODES

(75) Inventors: Chauncey W. Griswold, Reno, NV (US); Harold E. Mattice, Gardnerville, NV (US); Richard L. Wilder, Sparks, NV (US); Christian E. Gadda, Las Vegas, NV (US)

(73) Assignee: IGT, Reno, NV (US)

(*) Notice: Subject to any disclaimer, the term of this patent is extended or adjusted under 35 U.S.C. 154(b) by 37 days.

This patent is subject to a terminal disclaimer.

(21) Appl. No.: 11/944,283

(22) Filed: Nov. 21, 2007

(65) Prior Publication Data

US 2008/0176645 A1 Jul. 24, 2008

Related U.S. Application Data

(63) Continuation of application No. 10/923,568, filed on Aug. 20, 2004, now Pat. No. 7,329,186.

(51) Int. Cl.
*A63F 9/24* (2006.01)
*A63F 13/00* (2006.01)

(52) U.S. Cl. .............................. 463/29; 463/1; 463/25; 463/30; 463/39; 463/40; 463/42; 463/43

(58) Field of Classification Search ..................... 463/1, 463/25, 30–33, 36–37, 39–43
See application file for complete search history.

(56) References Cited

U.S. PATENT DOCUMENTS 4,764,666 A * 8/1988 Bergeron ..................... 463/25
5,122,643 A * 6/1992 Gamou et al. ............... 235/384
5,179,517 A * 1/1993 Sarbin et al. .................. 463/25
5,265,874 A * 11/1993 Dickinson et al. ............. 463/25
5,287,181 A * 2/1994 Holman ...................... 348/473

(Continued)

FOREIGN PATENT DOCUMENTS

| | | |
|---|---|---|
| WO | WO03/058878 | 7/2003 |
| WO | WO 03/058878 | 7/2003 |
| WO | WO 2004/013820 | 2/2004 |

OTHER PUBLICATIONS

"Toshiba Debuts First Full-Color 'System on Glass' (SOG) Input Display with Image Capture Technology," Internet Publication, Jun. 28, 2004, ZP002350712.

(Continued)

*Primary Examiner*—Dmitry Suhol
*Assistant Examiner*—Steven J. Hylinski
(74) *Attorney, Agent, or Firm*—Weaver Austin Villeneuve & Sampson LLP

(57) ABSTRACT

Systems and methods for conducting cashless gaming or player tracking within a gaming environment are disclosed. Players with associated player accounts are provided player tracking instruments having rewriteable displays. Also provided are gaming devices or machines having display panels adapted to display content and scan input through set display and read regions. Data on player tracking instruments is updated and displayed thereupon, and the input display panels of the gaming devices are used to read this data. These input display panels can also be used to read biometric information from players to confirm proper player account associations. The player tracking instruments may contain an RFID tag to receive communications from a transceiver associated with the gaming device or machine. A feedback loop from a master gaming controller to a transceiver to a player tracking instrument to an input display panel and back to the master gaming controller can be created.

18 Claims, 8 Drawing Sheets

U.S. PATENT DOCUMENTS 5,471,044 A * 11/1995 Hotta et al. ................ 235/487
5,655,961 A * 8/1997 Acres et al. .................. 463/27
5,693,956 A * 12/1997 Shi et al. ..................... 257/40
5,702,304 A * 12/1997 Acres et al. .................. 463/29
5,741,183 A * 4/1998 Acres et al. .................. 463/42
5,752,882 A * 5/1998 Acres et al. .................. 463/42
5,814,796 A * 9/1998 Benson et al. ............. 235/375
5,820,459 A * 10/1998 Acres et al. .................. 463/25
5,836,817 A * 11/1998 Acres et al. .................. 463/26
5,839,956 A * 11/1998 Takemoto ................... 463/25
5,880,769 A * 3/1999 Nemirofsky et al. ........ 725/139
5,920,844 A * 7/1999 Hotta et al. .................... 705/1
5,941,774 A * 8/1999 Takemoto et al. ............ 463/31
5,944,606 A * 8/1999 Gerow ......................... 463/27
5,951,397 A 9/1999 Dickinson
5,971,271 A 10/1999 Wynn et al.
5,988,513 A * 11/1999 Dean et al. ................. 235/494
6,013,345 A * 1/2000 Koshida et al. .............. 428/78
6,019,284 A * 2/2000 Freeman et al. ............ 235/380
6,135,884 A 10/2000 Hedrick et al.
6,152,620 A * 11/2000 Ozawa et al. .......... 400/120.01
6,174,836 B1 * 1/2001 Hotta et al. ................ 503/201
6,251,014 B1 6/2001 Stockdale et al.
6,313,856 B1 * 11/2001 Ulrich ....................... 347/171
6,327,376 B1 12/2001 Harkin
6,394,907 B1 5/2002 Rowe
6,422,468 B1 * 7/2002 Nishizawa et al. .......... 235/486
6,431,453 B1 * 8/2002 Hill et al. ................... 235/475
6,431,983 B2 * 8/2002 Acres .......................... 463/25
6,450,407 B1 * 9/2002 Freeman et al. ............ 235/492
6,503,147 B1 1/2003 Stockdale et al.
6,629,591 B1 * 10/2003 Griswold et al. ........... 194/205
6,675,152 B1 1/2004 Prasad et al.
6,682,421 B1 1/2004 Rowe et al.
6,712,698 B2 * 3/2004 Paulsen et al. ............... 463/30
6,745,944 B2 * 6/2004 Dell .......................... 235/492
6,769,986 B2 8/2004 Vancura
6,800,030 B2 * 10/2004 Acres .......................... 463/25
6,825,692 B1 11/2004 Nguyen et al.
6,831,710 B2 12/2004 den Boer
6,852,031 B1 * 2/2005 Rowe .......................... 463/29
6,905,411 B2 6/2005 Nguyen et al.
RE38,812 E * 10/2005 Acres et al. .................. 463/26
7,027,056 B2 4/2006 Koselj et al.
7,088,326 B2 8/2006 Lin et al.
7,119,759 B2 * 10/2006 Zehner et al. ................ 345/1.1
7,128,482 B2 * 10/2006 Meyerhofer et al. ... 400/124.08
7,192,208 B2 * 3/2007 Meyerhofer ................ 400/521
7,240,023 B1 * 7/2007 Powell ........................ 705/14
7,267,614 B1 * 9/2007 Jorasch et al. ................ 463/25
7,287,695 B2 * 10/2007 Wankmueller .............. 235/383
7,329,186 B2 * 2/2008 Griswold et al. .............. 463/29
2002/0167500 A1 * 11/2002 Gelbman .................... 345/204
2002/0173354 A1 * 11/2002 Winans et al. ................ 463/20
2003/0036425 A1 * 2/2003 Kaminkow et al. ........... 463/25
2003/0064812 A1 * 4/2003 Rappaport et al. ............ 463/43
2003/0078094 A1 * 4/2003 Gatto et al. ................... 463/25
2003/0162591 A1 * 8/2003 Nguyen et al. ................ 463/29
2003/0162593 A1 * 8/2003 Griswold ..................... 463/39
2003/0171145 A1 * 9/2003 Rowe .......................... 463/25
2003/0199312 A1 * 10/2003 Walker et al. ................. 463/25
2004/0043813 A1 * 3/2004 Chamberlain et al. ......... 463/25
2004/0053692 A1 3/2004 Chatigny et al.
2004/0087360 A1 * 5/2004 Chamberlain et al. ......... 463/25
2004/0136764 A1 * 7/2004 Meyerhofer et al. .......... 400/82
2004/0192438 A1 9/2004 Wells et al.
2004/0192442 A1 * 9/2004 Wells et al. ................... 463/36
2004/0204233 A1 * 10/2004 Saffari et al. .................. 463/25
2004/0209674 A1 * 10/2004 Conover et al. ............... 463/25
2004/0233930 A1 11/2004 Colby, Jr.
2005/0077995 A1 4/2005 Paulsen et al.
2005/0085293 A1 * 4/2005 Lindo .......................... 463/25
2005/0090308 A1 * 4/2005 Weiss .......................... 463/25
2005/0240778 A1 * 10/2005 Saito .......................... 713/186
2005/0282626 A1 * 12/2005 Manfredi et al. .............. 463/25
2006/0000891 A1 * 1/2006 Bonalle et al. .............. 235/380
2006/0000892 A1 * 1/2006 Bonalle et al. .............. 235/380
2006/0000893 A1 * 1/2006 Bonalle et al. .............. 235/380
2006/0000894 A1 * 1/2006 Bonalle et al. .............. 235/380
2006/0000895 A1 * 1/2006 Bonalle et al. .............. 235/380
2006/0016884 A1 1/2006 Block et al.
2006/0019745 A1 1/2006 Benbrahim
2006/0025212 A1 * 2/2006 Griswold et al. .............. 463/29
2007/0021191 A1 * 1/2007 White et al. .................. 463/25
2007/0032295 A1 * 2/2007 Muir et al. .................... 463/29
2009/0011821 A1 1/2009 Griswold et al.

OTHER PUBLICATIONS

"Toshiba Debuts First Full-Color 'System On Glass' (SOG) Input Display With Image Capture Technology", Internet Publicaiton, May 25, 2004, from htty://www.toshiba.com/taec/news/press_releases/2004/1cdb_04_218.jsp.

Anonymous, "Tobisha Debuts First full-color 'system on glass' (SOG) Input Display with Image Capture Technology." Daily PDA Today News, Online. May 25, 2004. URL:http://www.pdatoday.com/more/A1622_0_1_0_M XP-002351532.

"LCD Adds Built-In Scanner," Martyn Williams, IDG News Service, Apr. 2003.

"The New Capture LCD from Toshiba Matsushita Display Technologies," DCViews, News Bulletin, Apr. 2003, http://www.dcviews.com/press/ToshibaMatsushita.htm.

"Captivating Display from Toshiba," InfoSync World, Jorgen Sundgot, May 2003, http://www.infosyncworld.com/news/n/3 572.html.

"Electronic Components and Materials," Toshiba Review, Science And Technology Highlights 2003, pp. 13-16, http://www.toshiba.co.jp/tech/review/2003/high2003/high2003pdf;10304.pdf.

"Toshiba America Electronic Components Demonstrates First 'System on Glass' (SOG) Input Display with Built-In Image Capture," May 2003, http://www.toshiba.com/taec/press/to-314.shtml.

US Office Action dated Mar. 19, 2008 issued in U.S. Appl. No. 10/899,908.

US Notice of Panel Decision from Pre-Appeal Brief Review, dated Aug. 25, 2008, issued in U.S. Appl. No. 10/899,908.

US Office Action dated Apr. 27, 2009 issued in U.S. Appl. No. 10/899,908.

First Chinese Office Action dated Jul. 18, 2008 issued in CN App. No. 200580027793.5.

"Toshiba Debuts First Full-Color 'System on Glass' (SOG) Input Display with Image Capture Technology," Internet Publication, Jun. 28, 2004, ZP002350712.

International Search Report in Corresponding PCT Application PCT/US2005/026677, Mailed Jan. 6, 2006.

Written Opinion in Corresponding PCT Application PCT/US2005/026677, Mailed Jan. 6, 2006.

"Toshiba Debuts First Full-Color 'System on Glass' (SOG) Input Display With Image Capture Technology", Internet Publicaiton, May 25, 2004, from htty://www.toshiba.com/taec/news/press_releases/2004/1cdb_ 04_ 218.jsp.

Office Action from prior patent U.S. Appl. No. 10/923,568, dated Jun. 26, 2007.

Notice of Allowance and Notice of Allowability from prior patent U.S. Appl. No. 10/923,568, dated Sep. 5, 2007.

Allowed claims from prior patent U.S. Appl. No. 10/923,568.

Anonymous, "Tobisha Debuts First full-color 'system on glass' (SOG) Input Display with Image Capture Technology." Daily PDA Today News, Online, May 25, 2004. URL:http://wwwpdatoday.com/more/AI622 0 1 0 M XP-002351532.

International Search Report and Written Opinion dated Nov. 15, 2005 for International application No. PCT/US2005/025636, filed on Jul. 19, 2005.

"LCD Adds Built-In Scanner," Martyn Williams, IDG News Service, Apr. 2003.

"The New Capture LCD from Toshiba Matsushita Display Technologies," DCViews, News Bulletin, Apr. 2003, http://www.dcviews.com/press/Toshiba Matsushita.htm.

"Captivating Display from Toshiba," InfoSync World, Jorgen Sundgot, May 2003, http://www.infosyncworld.com/news/n/3 572.html.

"Electronic Components and Materials," Toshiba Review, Science and Technology Highlights 2003, pp. 13-16, http://www.toshiba.co.jp/tech/review/2003/high2003/high2003pdf;10304.pdf.

"Toshiba America Electronic Components Demonstrates First 'System on Glass' (SOG) Input Display with Built-In Image Capture," May 2003, http://www.toshiba.com/taec/press/to-314.shtml.

Office Action dated Aug. 30, 2007 from U.S. Appl. No. 10/899,908.

* cited by examiner

PLAYER TRACKING INSTRUMENTS HAVING MULTIPLE COMMUNICATION MODES

CROSS REFERENCE TO RELATED APPLICATION

This application claims priority to co-pending and commonly owned U.S. patent application Ser. No. 10/923,568, filed on Aug. 20, 2004, which is incorporated herein by reference in its entirety and for all purposes.

TECHNICAL FIELD

The present invention relates generally to gaming devices, and more specifically to systems and methods for conducting cashless gaming or player tracking within a gaming environment.

BACKGROUND

Casinos and other forms of gaming comprise a growing multi-billion dollar industry that is continually looking for new and better ways to provide and administer a wide array of gaming activities and to attract and retain players through exciting game play, as well as various player perks, conveniences and player friendly programs and devices. Many casinos and gaming operators are quite responsive to player preferences and trends, and are also proactive in implementing new and better games, programs and systems in order to maintain or improve player convenience, satisfaction and interest levels. As an example of responsiveness to player trends and preferences, the casino and gaming industries have implemented increasing numbers and percentages of electronic and advanced gaming machines as these industries have experienced a marked shift over the past few decades in player preferences from table games to gaming machines, and from fully mechanical gaming machines to electronic and microprocessor based gaming machines. Other examples of new and improved player friendly programs and devices include forays into cashless gaming and various player tracking and reward programs, among others.

Although the present discussion and invention can encompass all forms of gaming and even implementations outside of a general gaming context, the discussion herein shall be primarily focused on gaming machines for purposes of convenience and illustration. In a typical gaming machine, such as a video poker or slot machine, a game play is first initiated through a player wager of money or credit, whereupon the gaming machine determines a game outcome, presents the game outcome to the player and then potentially dispenses an award of some type, including a monetary award, depending on the game outcome. Although this process is generally true for both mechanical and electronic gaming machines, the electronic machines tend to be more popular with players and thus more lucrative for casinos for a number of reasons, such as increased game varieties, more attractive and dynamic presentations and the ability to award larger jackpots. In addition, electronic gaming machines are typically much better adapted for use in conjunction with the various cashless gaming and player tracking programs that are offered within the industry.

Electronic and microprocessor based gaming machines can include a number of hardware and software components to provide a wide variety of game types and game playing capabilities, with such hardware and software components being generally well known in the art. A typical electronic gaming machine will have a central processing unit ("CPU") or master gaming controller ("MGC") that controls various combinations of hardware and software devices and components that encourage game play, allow a player to play a game on the gaming machine and control payouts and other awards. Software components can include, for example, boot and initialization routines, various game play programs and subroutines, credit and payout routines, image and audio generation programs, various component modules and a random number generator, among others. Exemplary hardware devices can include bill validators, coin acceptors, card readers, keypads, buttons, levers, touch screens, coin hoppers, ticket printers, player tracking units and the like.

In addition, each gaming machine can have various audio and visual display components that can include, for example, speakers, display panels, belly and top glasses, exterior cabinet artwork, lights, and top box dioramas, as well as any number of video displays of various types to show game play and other assorted information, with such video display types including, for example, a cathode ray tube ("CRT"), a liquid crystal display ("LCD"), a light emitting diode ("LED"), a flat panel display and a plasma display, among others. Apparatuses and methods for providing displays in gaming machines and/or within a casino are generally well known, and instances of such apparatuses and methods can be found in, for example, U.S. Pat. Nos. 5,971,271; 6,135,884; 6,251,014; and 6,503,147, all of which are incorporated herein by reference in their entirety and for all purposes. Again, while the present disclosure focuses on gaming machines, it will be readily understood that that the following discussions and inventive examples can be expanded to all aspects of gaming and to implementations outside of a gaming context in some instances.

One way of gaining and maintaining interest in game play is through the use of cashless gaming, whereby players do not need to deal with the hassle of cash, coins, jammed devices, insufficient cash on hand for jackpot payouts and other such inconveniences associated with game play. Various items and devices that are usable in cashless gaming systems include cashless instruments such as smart cards or other types of player tracking cards, paper tickets and the like, as well as card readers, ticket printers, ticket readers and validators, network servers and specialized ticket terminals, among others. A particular example of a cashless gaming system is the EZPay™ system by IGT of Reno, Nev. Other specific examples of uses and implementations of such systems and networks involving the same or other similar cashless gaming instruments and systems can be found in co-pending and commonly owned U.S. application Ser. No. 09/544,884 by Rowe, et al. filed Apr. 7, 2000, entitled "Wireless Gaming Environment;" U.S. application Ser. No. 09/684,382 by Rowe filed Aug. 25, 2000, entitled "Cashless Transaction Clearinghouse;" U.S. application Ser. No. 09/718,974 by Rowe filed Nov. 22, 2000, entitled "EZPAY™ Smart Card and Ticket System;" and U.S. application Ser. No. 09/660,984 by Espin, et al. filed Sep. 13, 2000, entitled "Transaction Signature," with each of the foregoing references being incorporated herein in its entirety and for all purposes.

Another way of gaining and maintaining interest in game play is through the use of various player tracking programs, loyalty credit or point programs, or other such player reward programs that are offered at various casinos. Such programs are generally well known in the art, and typically provide player rewards that correspond to the level of patronage or betting activity engaged in by a player. Such rewards tend to be in the form of complimentary items or "comps," which may include, for example, free or reduced rates on meals, lodging, entertainment and the like. These rewards may help to sustain the interest of a player in additional game play during a visit to a gaming establishment, and may also encourage player loyalty by enticing a player to return to a gaming establishment having a rewards program of which the player is a member. When a player wants to play a game at a gaming machine or other gaming event location and also utilize any player tracking service or loyalty program that may be offered at a gaming establishment, the player typically inserts a player tracking card such as a magnetic striped card or other like instrument into a player tracking unit having a card reader at the gaming machine or gaming event location. After the magnetic striped card has been inserted, the player tracking unit may detect this event, receive certain identification information contained on the card, and hold the card during gaming activities at the gaming machine or other gaming event location. Wagering and gaming activities of the player are tracked and noted while the card is in the player tracking unit, and such information may be recorded as desired, such as on a central player tracking server. Loyalty credits or points may be awarded to the player based upon the amount of game play and/or other factors, as will be readily appreciated by those skilled in the art. When the player is finished at a particular gaming machine or gaming event location, the player then retrieves his or her player tracking card from the card reader.

The current state of the art in many of the foregoing and similar systems requires that items such as card readers, ticket printers, ticket readers and validators and other components, as well as player cards, tickets and other cashless instruments be used. Unfortunately, each of these added items tends to result in some amount of initial costs, overhead and maintenance when implementing and operating such cashless gaming systems. Further costs for some items, such as paper tickets and ink, can be counted on as recurring costs that will typically never end. Also, many card readers require that a player insert a card into the reader for an extended period of time, often for an entire gaming session, which can be inconvenient at least with respect to players not having control over their cards or other instruments at all times.

While present systems and methods for cashless gaming and player tracking and rewards have certainly proved to be important and successful, there is always room for improvement and innovation in these areas. In particular, there exists a desire for improved systems and methods for cashless gaming and player tracking that provide even more conveniences to players, and in particular for such systems and methods to facilitate automated cashless transactions and player tracking activities within a gaming environment while allowing players to retain full control of their player tracking cards or other such instruments at all times.

SUMMARY

It is an advantage of the present invention to provide improved and more convenient systems and methods for facilitating automated cashless transactions and player tracking activities within a gaming environment. This is accomplished in many embodiments by providing player with player tracking instruments that have rewriteable displays thereupon, as well as gaming devices having display devices that are adapted both to display content and read or scan input through the same regions on the display devices. In this manner, information and data on the player tracking instruments, such as player cards, can be updated as necessary and displayed on the instruments or cards themselves, and the input displays of the gaming devices can be used to read this and other player related information through their displays.

According to several embodiments of the present invention, the disclosed systems and methods involve providing one or more gaming events at a gaming event location involving the placement of wagers, the play of games, and the possibility of monetary awards based upon the outcomes of the games. In a particular embodiment, a method of administering a wager based gaming event is provided. One step in such a method involves permitting a player at the gaming event location to check in with a player tracking instrument. Another step involves reading or scanning this player tracking instrument through a display device having a "display and read" region that is adapted both to display gaming related information and to read player related information therethrough. Information read from the player tracking instrument is associated with an account assigned to the player, and funds from this player account are allowed to be available to the player for the play of the gaming event. Other steps can include accepting a wager from the player involving at least a portion of these player account funds, and playing the gaming event.

In more detailed embodiments, the player tracking instrument can be a player tracking card, a credit card, a debit card, a smart card, a magnetic striped card, a printed ticket, a room key, a keychain, a bracelet, a wristwatch, a lucky token, or a portable wireless device, among other items. This player tracking card or instrument may include a rewritable display, a radio frequency identification tag, or both, with such items being used to facilitate communications within the provided system and method. In some detailed embodiments, this player tracking instrument may become part of a feedback loop with other system items. The rewritable display of the player tracking card or instrument can involve the use of electronic ink, thermal imprints, organic light emitting diodes, or other such items. The player tracking card or instrument may also be adapted to store the player account directly thereon, and may also be used to store player credits or monetary values. Conversely, player credits or monetary values may be stored on a remote server or other like device.

Other detailed embodiments include the use of a gaming machine for the play of one or more gaming events of interest, with the gaming machine location being the gaming event location. Further, the display device may be a part of a gaming machine, may comprise an LCD panel having a built-in scanner, or both. Such an LCD panel with a built-in scanner might involve the implementation of pixel groupings where many pixel groupings contains at least one pixel for displaying images and at least one pixel for scanning or reading images. This scanning function of the display device may be used to read information from the player tracking card or instrument, from a biometric of the player, such as a handprint or fingerprint, or other information. In addition, both game play information and other information may be displayed through the display device region that is also used to scan or read information therethrough as input.

According to other embodiments of the present invention, which can include some or all of the steps or features of one or more of the foregoing general or detailed embodiments, the disclosed systems and methods can include additional steps and features. Such steps and features may involve any of the following items in isolation or any combination or full compilation thereof. Such steps and features can include prompting the player to provide a player specific biometric identifier, reading this biometric identifier through the "display and read region" of the display device, and verifying that the biometric identifier corresponds to biometric information that has been previously stored for the player. Other steps include providing a plurality of gaming events and tracking a monetary balance for the player with respect to the outcome or outcomes of one or more gaming events, as well as prompting the player to check in again with the player tracking instrument, sending a radio frequency communication to the player tracking instrument, rewriting at least a portion of the rewritable display on the player tracking instrument in response to this radio frequency communication, reading the rewritten portion through the "display and read" region, confirming that the rewritten portion is correct in accordance with the radio frequency communication, and crediting at least a portion of the monetary balance to the player account.

This crediting step may include storing a monetary balance or portion thereof on the player tracking instrument, or it might include transferring a monetary balance or portion thereof to a remote server. In one detailed embodiment, a large monetary award based upon the outcome of a gaming event may be granted, with this monetary award being larger than the amount of cash available at the gaming event location to pay off the award. In such an instance, a crediting step to a player account obviates any need for a manual hand pay of this large monetary award.

In yet another embodiment, a gaming system is provided for use in conjunction with gaming events involving the placement of wagers, the play of games, and the possibility of monetary awards based upon the outcomes of the games. This gaming system can include at least one computer server, at least one gaming device, a plurality of player tracking instruments, and at least one radio frequency communication device. A computer server is adapted to facilitate the tracking of information associated with gaming events, while a gaming device is in communication with this computer server and is adapted for use in association with the gaming events. The gaming device preferably includes a display panel having a "display and read" region adapted both to display gaming related information and to read player related information therethrough. The plurality of player tracking instruments or cards are for use by players within the gaming system, and these instruments or cards each contain a radio frequency identification tag therein and a rewritable display thereupon. A radio frequency communication device is set to be in communication with the gaming device and is adapted to communicate via radio frequency waves with the player tracking instruments or cards.

In various detailed embodiments, this gaming system may also include a database in communication with the computer server, with this database containing data with respect to a plurality of players. As in the above embodiments, the gaming device might also be a gaming machine, and many other detailed embodiments or variations might also apply, such as the use of an LCD display and input panel, for example. In addition, a feedback loop can be created between a gaming device, a radio frequency communication device and a player tracking instrument. Such a feedback loop might involve the communication of data from the gaming device to the radio frequency communication device to the player tracking instrument and back to the gaming device. In the event that the gaming device is an electronic gaming machine having a display device and master gaming controller, then this feedback loop might involve the communication of data from the master gaming controller to the radio frequency communication device to the player tracking instrument to the display device and back to the master gaming controller.

In still another embodiment, the present invention involves an electronic gaming machine adapted for accepting wagers, playing games and granting monetary awards. This electronic gaming machine includes a master gaming controller adapted to provide gaming events and control a plurality of gaming machine functions, an external cabinet adapted to house a plurality of gaming machine components, a display device having a "display and read region" adapted to display gaming related information and to scan player related information from a substantially flat surface of a player tracking instrument, a communication link or path between the master gaming controller and display device, a radio frequency communication device located within or about the external cabinet and adapted to communicate via radio frequency waves with the player tracking instrument, and a communication link or path between the master gaming controller and the radio frequency communication device. The master gaming controller may be located within the external cabinet, and many other details of this particular embodiment may be taken from one or more of the foregoing general and detailed embodiments.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to the invention by one skilled in the art without departing from the spirit and scope of the invention.

DETAILED DESCRIPTION

Figure 1:
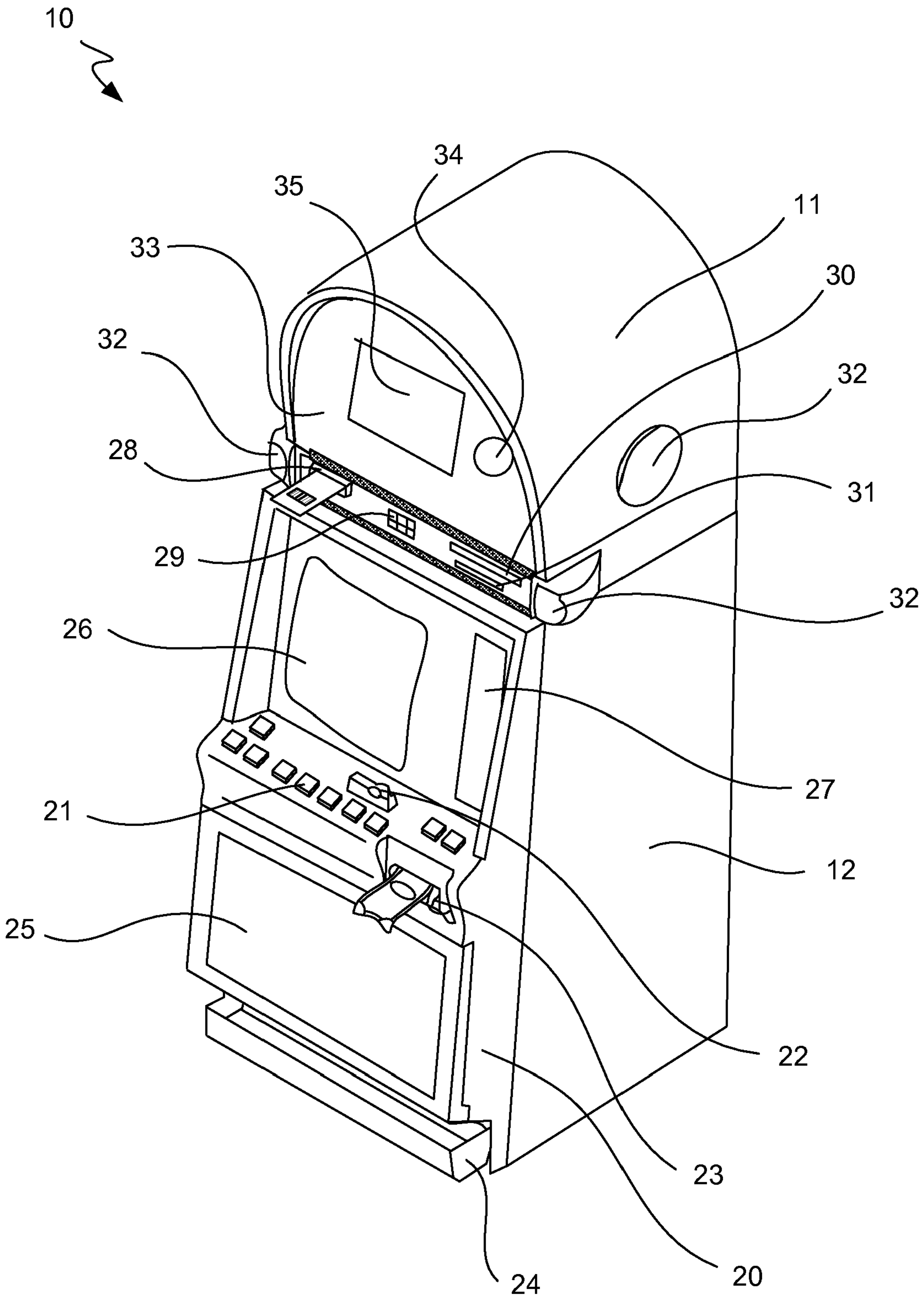
FIG. 1 illustrates in perspective view an exemplary gaming machine.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is the reduction or elimination of recurring cost items that are typically associated with many cashless gaming systems or programs, such as printed tickets and ink. This is accomplished through the use of specialized player tracking instruments or cards that facilitate the processing of cashless transactions and accounting without the need for paper tickets. Another advantage inherent to the use of such specialized instruments or cards is the ability of players to access remote player accounts through proper use of the cards. Such remote player account access may require the use of a player specific biometric and a verification program, in addition to the use of specialized instruments or cards.

Another advantage of the disclosed system and method is the ability to permit players to retain full control of their player tracking cards or other such instruments at all times. This can be accomplished through the use of gaming devices having specialized input display panels, whereby gaming information is displayed through and player specific information is scanned or read through the same regions of the input display panels. A further advantage that can be realized through the combined use of these specialized player tracking instruments or cards and these specialized input display "display-read" panels is that a feedback loop can be formed between a particular gaming device or machine and a particular player tracking card or instrument, such that new or updated information can be specifically written to a rewritable display on the card and then verified to be correct.

Yet another advantage of the disclosed system and method is the ability to incorporate the inventive devices and techniques detailed herein into other items and ventures that extend beyond the play and administration of wager based games and gaming. It is thus again noted that while the inventive cashless gaming and player tracking systems and methods disclosed herein are being described primarily with references to and illustrations of gaming establishments, gaming machines, player tracking devices and instruments and wager based games of chance in general, these systems and methods are readily adaptable for use in other types of businesses and environments, such that their use is not restricted exclusively to gaming environments and contexts. Examples of such other items and ventures can include individual identifications and payments with respect to hotel and transportation reservations and check-ins, restaurant visits, retail outlet registrations and purchases and the like. Such uses can be in conjunction with a gaming based system, or separately altogether.

The remainder of the detailed description herein shall first discuss a specific exemplary use of one embodiment of the present invention, followed by general discussions of gaming machines, radio frequency identification tags and input displays. Following that, specific embodiments of specialized gaming devices and specialized player tracking instruments are provided, after which exemplary network and system configurations are given. Finally, several exemplary methods of utilizing these components are described in detail.

Specific Exemplary Use

As an introduction to the various embodiments described herein, a very specific example under a particular implementation according to the present invention will now be provided. It will be readily appreciated that the following example is picked from a potentially infinite number of possibilities that may occur under the present invention, such that this example is not limiting in any way. According to this example, a specific player approaches a gaming machine within a casino and initiates a gaming session at that gaming machine. The primary display of the gaming machine prompts the player to "Place Player Tracking Card Here" within a box highlighted on the display itself. Since the player does have a player tracking card, a minimal amount of cash, and desires both to access funds from a remote player account and get player tracking points for gaming activities, the player places an appropriate player tracking card up against the screen within the designated box. The gaming machine then scans and inputs information displayed on the player tracking card through the display panel, and inquires as to whether funds from a remote player account are desired for play at the gaming machine.

The player selects a "yes" option, and is then prompted by the gaming machine to "Place Right Hand Here" within another box highlighted on the display itself. The player then places his or her right hand within the designated box on the display screen, at which point the gaming machine scans and inputs the handprint of the player through the display panel. Information read from both the player tracking card and the handprint of the player are then processed against known information within a system database, and approval is then given for that player for a remotely administered account funds transfer based upon good readings of card information and the player handprint. An inquiry is made as to the amount to be transferred, and the player then proceeds to authorize the transfer of $100 from the remote account for play at that gaming machine. The remote player account is then reduced by $100 as a result. The player then plays at that gaming machine for about one hour, after which time a balance of $165 exists on the machine, for a net winning to the player of $65.

The player then selects a "cash out" or "end session" option, and is asked whether a cash payout or player account credit is desired. The player opts for a cash payout, at which point the gaming machine dispenses $165 in cash to the player. An appropriate amount of player tracking points are awarded to the player, which award may be made to a player tracking server that is networked with that particular gaming machine. In addition, a radio frequency signal indicating the appropriate amount of player tracking points is sent to the player tracking card of the player, and the player is prompted one last time to "Place Player Tracking Card Here" within a box highlighted on the display itself. The player tracking card adjusts a rewritable display on the card that shows the number of player tracking points in the player rewards program account of that player, and this number of points is adjusted in accordance with the radio signal that is emitted from a radio frequency transceiver within the gaming machine. When the player places the card up against the display again, the gaming machine reads this rewritten points balance number and verifies that it has been appropriately rewritten. A final "authorized and correct" signal is then sent out to the card, and the display lets the player know that the player tracking points transaction has been successfully completed and that the displayed amount of points on the player tracking card is correct.

The player then stops at a second gaming machine on the way to dinner, where the player again checks in with the same player tracking card. Rather than transfer funds, however, the player elects to insert cash to play only for a few plays at this second gaming machine. As such, the second gaming machine does not request a hand print or other biometric from the player in order to authorize a funds transfer from a player account. After just a few plays at this second gaming machine the player hits a huge jackpot, which is so large that the gaming machine is not able to pay the entire amount out to the player in cash. Ordinarily, this would require an attendant or other casino personnel to come to the machine, verify the win, and make a full payout to the player by cash, check or other financial instrument.

Because the player is in a hurry though, the player is happy to select the "credit player account" option for this huge jackpot. After selecting this option, the player is again prompted to "Place Player Tracking Card Here" within a box highlighted on the display itself, after which the player is prompted to "Place Right Index Finger Here" within the same box highlighted on the display. Although the first gaming machine had different regions on the screen to read cards and biometrics, this second gaming machine uses the same region on its display panel for these functions. The biometric information for the player is again confirmed against that which is on file, and the huge jackpot award is then transferred and credited to the player account for this player. The player is then happily on his or her way, and does not need to wait for an attendant or anyone else to arrive at the gaming machine for a time consuming and cumbersome hand pay of the jackpot.

Again, this example represents only one of the myriad possible outcomes and arrangements under a system or method for automated cashless gaming and player tracking within a gaming or related environment. The following detailed description will now provide for other possibilities and implementations of these and other such systems and methods at varying levels. Again, it should be remembered that not all implementations of the inventive systems and methods disclosed herein must use or be associated with a gaming system or establishment, and that details under such systems and establishments are provided only for purposes of illustration.

Gaming Machines

Referring first to FIG. 1, an exemplary gaming machine according to one embodiment of the present invention is illustrated in perspective view. Gaming machine 10 includes a top box 11 and a main cabinet 12, which generally surrounds the machine interior (not shown) and is viewable by users. Main cabinet 12 includes a main door 20 on the front of the machine, which opens to provide access to the interior of the machine. Attached to the main door are typically one or more player-input switches or buttons 21, one or more money or credit acceptors, such as a coin acceptor 22, and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional electronically controlled video monitor. Top box 11, which typically rests atop of the main cabinet 12, may also contain a bill or ticket validator 28, a key pad 29, one or more additional displays 30, a card reader 31, one or more speakers 32, one or more cameras 33, and a secondary video display monitor 34, which may also be a cathode ray tube, high resolution flat-panel LCD, plasma/LED display or other conventional electronically controlled video monitor. Gaming machines such as this are made by many manufacturers, such as, for example, IGT of Reno, Nev.

In particular, IGT gaming machines are implemented with special features and additional circuitry that differentiate them from general-purpose computers such as desktop personal computers and laptops. Some of these components and features are included in the network devices of the present invention, as appropriate. Some examples of these components and features are described below. For example, a watchdog timer is normally used in IGT gaming machines to provide a software failure detection mechanism. In a normal operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the slot machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general purpose computers.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features and functions may also be used in association with gaming machine 10, and it is specifically contemplated that the present invention can be used in conjunction with such a gaming machine or device that might encompass any or all such additional types of features and functions. Particular items that are specifically contemplated for use with the present invention include a radio frequency transceiver and an LCD input display, both of which can be installed about or within the gaming machine to facilitate communications between the gaming machine and one or more player tracking cards or instruments.

RFID Tags

Radio frequency identification ("RFID") tags and systems have been widely adopted in recent years for the traceability and tracking of a wide variety of products and objects. Although these wireless systems are similar to UPC bar code type systems in that they allow for the non-contact reading of various products, items and devices, they are an effective improvement over UPC bar code systems in a variety of ways. In fact, RFID tags and systems can be vastly superior to bar code systems in many manufacturing and other hostile environments where bar code labels are inconvenient or wholly impractical. One advantage of RFID tags and systems is the non-line-of-sight nature of the technology, whereby tags can be read through a variety of substances such as snow, fog, clothing, paint, packaging materials or other conditions where UPC bar codes or other such technologies would be useless.

In most applications, an ordinary RFID system comprises three primary components: 1) a transceiver for transmitting and receiving radio frequency signals, 2) a transponder electronically programmed with data, preferably comprising unique information, and 3) at least one antenna. The transceiver is generally analogous to a bar code scanner, and controls communication within the system by restricting when and where data is written, stored and acquired. The transponder is analogous to a bar code label, and typically comprises at least a small integrated circuit chip, with this chip often being referred to as an RFID Integrated Circuit ("RFIDIC"). Antennae function as conduits between RFIDICs and transceivers, as RFIDICs are frequently too small to act as their own antennae and collect a sufficient level of emitted radio signals standing alone. Antennae can be attached to the transceiver, transponder, or both, and are generally used to emit and/or collect radio signals to activate an RFIDIC, read data from the RFIDIC and/or write data to it.

In general, the term "RFID tag" refers to the combination of the RFIDIC and any antennae attached thereto. An RFID tag is essentially a microchip with antennae that listens for a radio query and responds by transmitting an identification code that is usually unique to that RFID tag. In operation, the transceiver emits radio waves that usually range from a fraction of an inch to 100 feet or more, depending upon the power output and radio frequency utilized. When an individual RFID tag passes through an electromagnetic zone covered by the transceiver, it detects the activation signal of the transceiver and responds by emitting its individual recorded code. The "reader" or transceiver then collects this emitted code and passes this data along to a host computer or other like device for processing. Such RFID tags and readers are specifically contemplated for various uses in gaming machines and devices according to the present invention, as described in greater detail below.

Input Displays

Another item that is specifically contemplated for various uses in association with gaming machines and devices according to the present invention is an input display device, such as an LCD input display or panel. LCD input displays are a recent innovation that allows a display screen to scan input or capture images directly into the screen. In addition to the ability to display images as in any normal LCD, such input displays include a data input function that enables them to capture images directly via sensors within a thin film photosensitive transistor layer built into the screen itself. This input display function is different from a camera, in that it inputs actual size images directly from the built-in image sensors, which are typically incorporated at the pixel level. For example, there can be one image sensor for every RGB pixel in the LCD display. Alternatively, other sensor to RGB pixel ratios can be used, such as 1-2, 2-1, 3-1 and so forth, as desired for various input and redisplay resolution applications. This technology can be used in many ways, such as, for example, to capture data from a catalog, to read barcodes, or to recognize and authenticate handprints or fingerprints for security applications, among other uses.

One example of such a device is that which has been designed and made by Toshiba Matsushita Display Technology Co., Ltd. of Tokyo, Japan ("TMD"), a joint venture of Toshiba and Matsushita Electric Industrial. TMD exhibited and provided demonstrations of such a prototype device at the Electronic Display Expo in Tokyo, Japan in April of 2003. The displayed prototype was a 3.5-inch diagonal low-temperature polysilicon thin film transistor LCD having a standard QVGA resolution format. To make this display, image sensors were added among the display pixels of a standard 3.5-inch polysilicon thin film transistor LCD. The display had a resolution of 320 pixels by 240 pixels, while the scanner had a resolution of 960 pixels by 240 pixels, which meant that it could reproduce actual size images of anything laid flat on its surface. Demonstrations involved the scanning of business cards and photographs, with the average input scan taking about seven seconds to complete. Although the scanned and redisplayed images at this demonstration were monochromatic, it is expected that color images, finer resolutions, larger LCD panels and faster processing times will all be available shortly using the same or similar techniques.

Specialized Gaming Devices

Figure 2A:
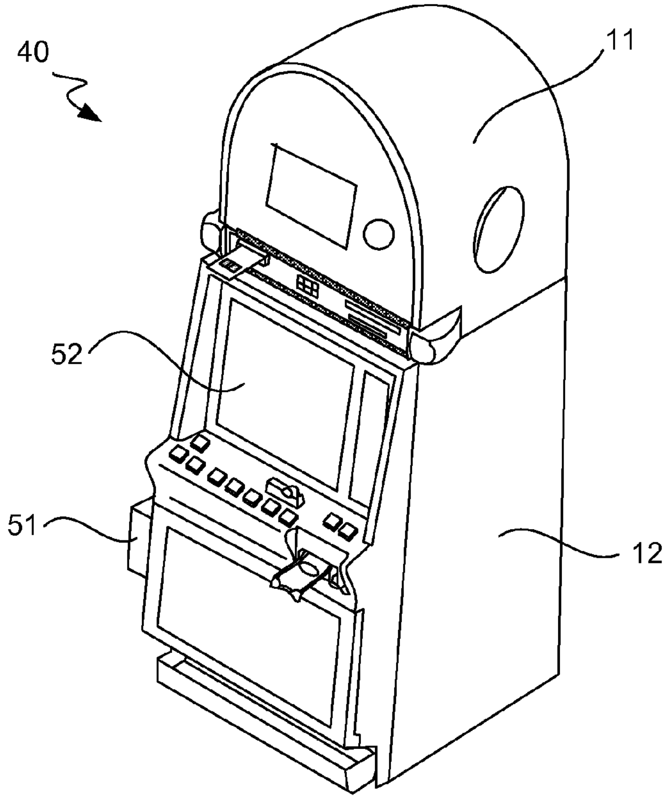
FIGS. 2A and 2B illustrate in perspective view alternative exemplary gaming machines according to various embodiments of the present invention.
Figure 2B:
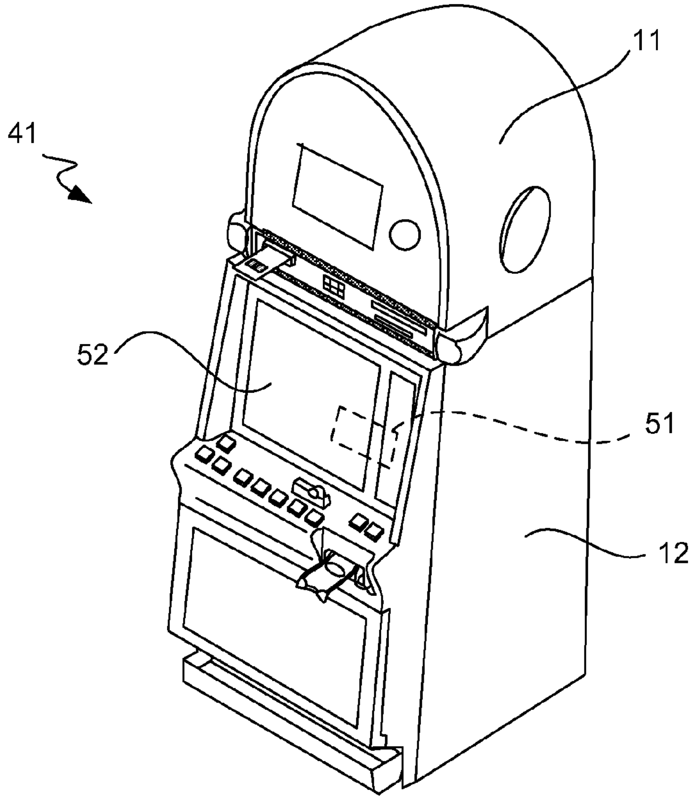

Turning now to FIGS. 2A and 2B, two alternative exemplary gaming machines according to various embodiments of the present invention are illustrated in perspective view. Gaming machines 40 and 41 are substantially similar to gaming machine 10 discussed above, in that both include a top box 11, a main cabinet 12, an MGC and various other peripheral devices and gaming machine components. Unlike standard gaming machine 10, however, gaming machines 40 and 41 both contain a player identifying device 51 and an input display 52. In gaming machine 40, player identifying device 51 is located on the outside of the gaming machine housing, while in gaming machine 41, this device is built into the gaming machine itself and located behind the input display 52. It will be readily understood that this device can be placed in various other locations within or about the gaming machine as desired without detracting from its function within the present invention. Further, while both of these gaming machines are shown to have the input display 52 as the primary gaming machine display, it will be readily appreciated that such an input display can be a secondary or tertiary display as well, and can similarly be located in a variety of places within or about the gaming machine.

Although the items illustrated are both specialized gaming machines, it will be readily appreciated that a wide variety of devices can be used in conjunction with the inventive devices, systems and methods disclosed herein. Such devices can be other specialized gaming devices having input displays and RFID communication capabilities, such as specially adapted player check in units that can be placed at table games, kiosks, remote gaming terminals, sports books, front desks and other locations as desired in and about a casino or gaming establishment. These devices can serve as special player tracking units and/or cash or credit access devices for any of a number of purposes associated with both gaming and other functions. In some embodiments, it may even be possible to have such devices used for patron, employee or other personnel check ins or registrations at other devices or locations outside of a gaming context. Although it will be understood that such other applications can be used with the inventive systems and methods disclosed herein, the focus herein shall remain on illustrative examples involving gaming machines for purposes of this discussion.

In one preferred embodiment, player identifying device 51 is an RFID transceiver that is in communication with the gaming machine and is adapted to act as a conduit between outside RFID tags and a player tracking system/network, a player accounting system/network, one or more processors at the gaming machine itself, or any combination thereof. Such an RFID transceiver can be, for example, an RI-R00-321A model Series 6000 Reader Module S6110 transceiver manufactured by Texas Instruments of Dallas, Tex. However, it will be readily appreciated that many other off-the-shelf or customized brands and types of RFID transceivers can also be effectively utilized for such a purpose. Besides acting as an RFID transceiver, player identifying device 51 can be coupled with a standard player tracking device used for player loyalty and rewards programs, with such devices and programs being well known in the art. In fact, it is specifically contemplated that the RFID transceivers of the present invention be incorporated into existing player tracking systems.

In this regard, the player tracking cards or instruments assigned to players are preferably implemented with individual RFID tags, as described in greater detail below. With such a system of RFID player tracking cards or instruments and RFID transceivers at gaming machines that act in the capacity of player tracking devices, it becomes possible for a player to check in with a player tracking card at a gaming machine without having to insert his or her card into a slot or otherwise relinquish control of the card. Such a check in might be accomplished by waving or placing the player tracking instrument in a certain area at the gaming machine, or might even be automatic in some cases where the transceiver can emit and "sense" signals from nearby cards without players ever having to remove their cards from their purses or wallets. In such cases, player loyalty credits or points for game play can be awarded automatically to the account of a nearby sensed RFID card or instrument when play takes place at a given gaming machine. Of course, such RFID transceivers can be multi-functional, such that they are also able to accept and process standard mag-stripe player tracking cards, especially where it is perceived that some players would prefer to use such older technology cards and systems.

In one preferred embodiment, input display 52 is an LCD input display or panel, such as the exact item made by TMD as described above or any similar device. This LCD input display serves as the primary display for the gaming machine, is adapted to act as a scanner to input to the gaming machine images of items that are placed up against its screen, which items can include player tracking cards, handprints and fingerprints, among others. The LCD input display panel is also preferably in communication with the gaming machine MGC, and is also preferably in direct or indirect communication with a player tracking system/network, a player accounting system/network, one or more other processors at the gaming machine itself, or any combination thereof, as in the case of the RFID transceiver above. In some cases, this LCD input display can be used in conjunction with a player tracking RFID card or other such instrument, the gaming machine, and the RFID transceiver described above to form a feedback loop, as described in greater detail below.

One important advantage to using such an LCD input display is to be able to eliminate or streamline the use of traditional touch screens, card readers, player tracking units, ticket printers and other player tracking and cashless gaming devices. This is accomplished by integrating these functions into a system utilizing the LCD input display and an RFID transceiver adapted to interact with specialized player tracking instruments or cards having RFID tags and rewritable displays. Costs to the gaming operator can thereby be reduced, as fewer hardware items are required and as renewed items such as paper tickets and ink are eliminated or reduced. Convenience to the player is increased, in that control over the player tracking card or instrument does not need to be relinquished, and in that the player may also be allowed to access funds from a remote player account, as described below. Of course, it will be readily appreciated that many conventional items may still be retained in such a system, as desired. One example can be a touch screen, the incorporation and use of which may be desired even with the advantages conferred through the inventive systems and methods disclosed herein. As noted above, another example can be the continued use of older magnetic striped cards in a hybrid system that accepts both these and the specialized cards or player tracking instruments of the present invention. These and other uses are described in greater detail below along with specific examples of methods of use in the present system.

Specialized Player Tracking Instruments

A wide variety of types, styles, sizes and shapes of RFID tags and objects can be used in conjunction with player identifying device or RFID transceiver 51 of gaming machine 40 or 41, and such RFID tags can also be off-the-shelf or customized items as desired for any particular application. Of particular importance is that such RFID tags be administered or managed in a sufficient manner by a casino, gaming operator, gaming regulator, or other competent authority, such that some degree of confidence can be had with respect to the correlation between an RFID tag being read and the player or person who is wearing, carrying, or otherwise controlling the tag bearing item. Although a virtually endless number of possible models, types and brands of RFID tags and be used for such purposes, several generic examples are given here for purposes of illustration.

One example of an off-the-shelf RFID tag can be an RFID card, with such cards being issued or checked out to players to use as player tracking instruments at various associated gaming machines, terminals and devices. Such cards could be, for example, the RI-TH1-CB1A model 13.56 MHz Vicinity Card Transponder that is manufactured by Texas Instruments. This particular Vicinity Card Transponder based on TI's Tag-it™ Smart Label technology is compliant with the ISO/IEC 15693 global standard for contactless integrated circuit cards operating at 13.56 MHz, allows interoperability of products from multiple manufacturers, has a memory of 2000 bits organized in 64 blocks, and enables advanced functionalities including access control, security, ticketing, production control and the like. This card is easily customized and personalized using standard thermo transfer printers, and also supports an extended set of command options, providing more system flexibility. Other card examples can include the RI-TRP-R4FF read-only model and the RI-TRP-W4FF read-write model Card Transponders, also manufactured by Texas Instruments.

Other RFID devices beyond cards could include tokens, objects or simply RFID tags themselves that can be inserted or attached to other devices, such as, for example, the RI-TRP-R9QL read-only model and the RI-TRP-W9QL read-write model 30 mm Disk Transponders, as well as the RI-TRP-R9UR read-only model and the RI-TRP-W9UR read-write model 85 mm Disk Transponders, all of which are also manufactured by Texas Instruments. Other off-the-shelf examples can include a key ring or keychain with an embedded RFID tag, such as the RI-TRP-RFOB-01 read-only model and the RI-TRP-WFOB-01 read-write model Keyring Tags, also made by Texas Instruments. Of course, many other models and brands of RFID tags can also be used in conjunction with the inventive systems and methods described herein, and such systems and methods are by no means limited to the foregoing relatively small listing of possible examples. Such items can be further customized to include other features as well, such as those provided in the exemplary cards described below.

Figure 3A:
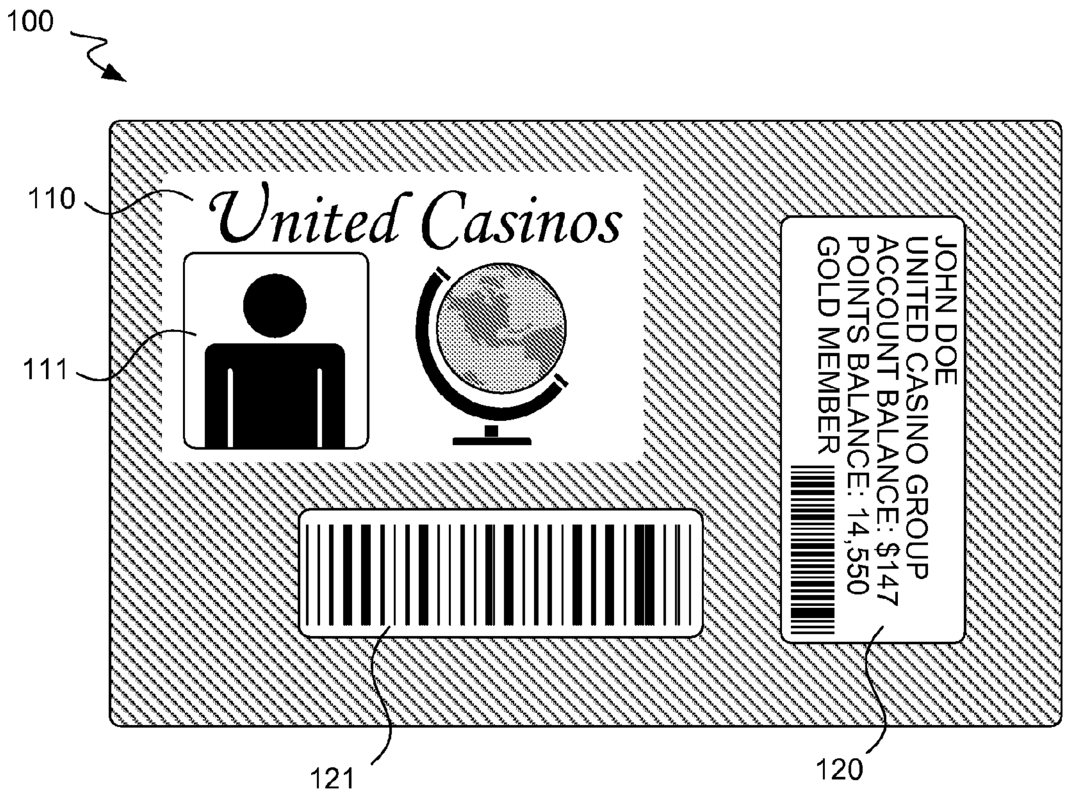
FIG. 3A illustrates in top plan view an exemplary player tracking card having a rewritable display and embedded RFID tag according to one embodiment of the present invention.
Figure 3B:
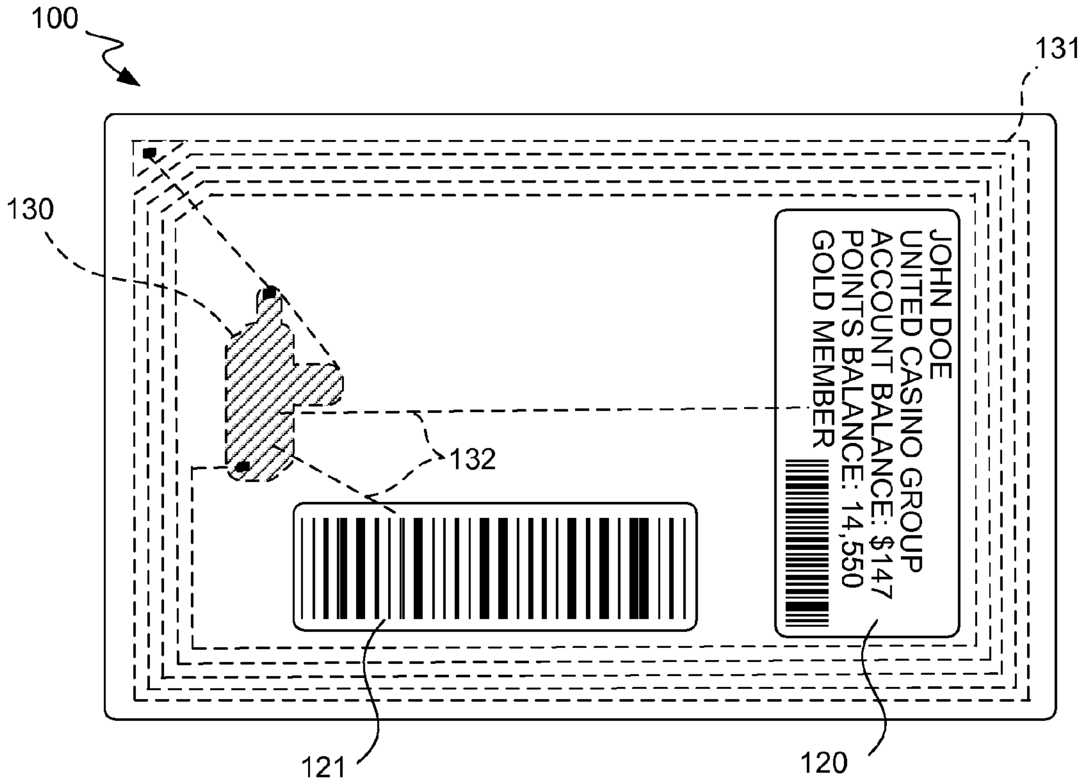
FIG. 3B illustrates in top plan and partial cut away view the exemplary player tracking card having a rewritable display of FIG. 3A.

Referring now to FIGS. 3A and 3B, an exemplary player tracking card having a rewritable display and embedded RFID tag according to one embodiment of the present invention is illustrated in top plan and top plan partial cut away views. Player tracking card 100 is preferably of the same or similar size and shape as an ordinary player tracking card, credit card, debit card, smart card and the like. In one particular embodiment, this card can be a modified Texas Instruments RI-TH1-CB1A model 13.56 MHz Vicinity Card Transponder as described above. As also noted above and discussed in greater detail below, it will be readily appreciated that a player tracking instrument such as card 100 is merely one type of specialized player tracking instrument, and that such instruments may take many other forms, shapes and sizes other than that of a card.

Card 100 can depict on its face a general information area or label 110 that can include a variety of identifying indicia, such as, for example, a card affiliation, type, operating entity or the like (i.e., "United Casinos"), one or more logos, marks or other informational notes and a picture 111 of the player, among other items. Card 100 may also contain one or more additional displays, such as rewritable displays 120 and 121. Display 120 can comprise a number of items set forth in text and/or picture formats, such as to inform the player or others of information regarding the owner of the card, one or more monetary, credit or point balances attributable to the owner, and the status of the owner within the card issuer system, among others. Display 120 may also comprise a bar code or other machine readable code as illustrated. Display 121 can be a separate display with different information and/or one or more informational items shown in display 120. As shown in FIGS. 3A and 3B, display 121 is simply a machine readable bar code that is enlarged so as to be more easily read by a machine or scanning device. It is particularly contemplated that the enlarged bar code of display 121 be of a size that can be quickly and reliably read by an LCD input display, such as the input display 52 of gaming machine 40 or 41. Although a simple one dimensional bar code is illustrated, it will be readily appreciated that formats such as two dimensional bar codes may also be used.

Also included in card 100 is an embedded RFID tag having an RFIDIC 130 and an attached antenna 131, the implementation and use of which will be readily understood by those skilled in the art. Contacts 132 between each rewritable display and the RFIDIC 130 are also embedded within card 100, such that the RFIDIC can be programmed to communicate with an outside transceiver, such as player identifying device 51 of gaming machine 40 or 41, and also to instruct or forward instructions to each display 120, 121 to rewrite its text, barcode and/or other shown content. The rewritable displays 120, 121 can be selected from any of a number of suitable types, such as an organic LED ("O-LED"), electronic ink ("EI") or a thermally rewritable display, the implementation and use of which will be readily understood by those skilled in the art. These or similar display types are preferable so that information can be written to the display one time and then frozen in an analog form that does not require power or refreshing, and that will remain static until written again.

In one embodiment O-LED displays are used, which conveniently allows for a semi-permanent diode type display that can remain indefinitely with no power until being rewritten again. Such a display is desirable in that a player can review his or her account balance, point totals and other information on a static and unchanged display for days or even years between uses. The display is then easily rewritable by an appropriate specialized gaming machine or device once the player returns and the card is used again. In another embodiment, EI displays are employed, the use of which involves spheres arranged in solution to form a dot matrix, with such spheres being black, white, grey or any combination thereof. As in the case of an O-LED or thermally rewritable display, the display would be semi-permanent and remain for the player to review indefinitely until the player returns and the display is rewritten with new information. Such EI displays are preferable due to their higher resolutions and ability to display images as well as text and barcodes. In addition, such displays do not require placement of the card or other player tracking instrument into or against a player tracking or rewriting unit to effect a rewriting of the display, as in the case of a thermally rewritable display below.

In yet another embodiment, thermally rewritable displays are used. Such displays are improvements over existing thermally rewritable tickets in that they are not as readily consumed and thus as costly as the paper tickets that are now used. Such a display is again statically semi-permanent and readable indefinitely until being rewritten again, as in the foregoing examples. However, the card or instrument would likely need to be inserted into a device or have its rewritable thermal display placed against a thermal printer at the time of rewriting or updating information for such a thermal rewrite of its display to be effected. Such a thermal rewrite device can be one that is stationed within or about the gaming machine, similar to that which is done for many traditional player tracking units today. Alternatively, these thermal rewrite devices can be small cigarette pack sized devices that could be carried and controlled by operator personnel, or they could be assigned or checked out to players, as desired. Such portable devices could have a slot or opening for accepting a player card or instrument, and might contain a battery, a separate RFID chip, a connector for plugging in to a gaming device, and/or one or more separate processors, as well as the equipment necessary for a thermal rewrite to the rewritable display of an inserted card. In the event that the specialized player tracking card or instrument contains a battery, such portable devices might also be equipped with recharging capabilities to recharge the card or instrument.

While it might be preferable for purposes of simplicity, convenience and cost to implement a system with player tracking instruments that do not require their own separate batteries, it is certainly contemplated that such cards or instruments could contain batteries. In such cases, additional features might be available, such as the use of card "blisters" or input buttons directly on the cards or instruments. Such blisters or buttons might provide a player with a way to access different types of information or change the information that is displayed. For example, alternative graphical presentations might be available to choose from, as well as an assortment of information and statistical data that cannot all fit onto one display. In addition, the card or other instrument might have a watch or timer feature that could be set or reset as desired. In such cases, blisters or input buttons would provide an input mechanism for a user, although the use of a battery (not shown) would likely be required. Such a battery might also enable the use of a more sophisticated processor than what can be incorporated into a battery-less RFID device. In a preferred embodiment, the player tracking instrument or card is only powered by the RF signal emitted from the gaming machine or device with the system transceiver. This provided power will typically be enough to communicate, encrypt and decipher messages to be communicated, store data, and process instructions for and rewrite the rewritable displays.

With or without battery power, which can be provided from within the instrument or card itself, or by a portable battery powered device to be associated with the card, as described above, it is preferable that the RF links or communications be limited in range to avoid unwanted crosstalk. Because gaming machines and devices are typically side-by-side or otherwise in close proximity on a casino floor, and because many patrons may be present within a closely contained space, it is preferable that the RF communication range be three feet or less. In a more preferred embodiment, this range should be three inches or less, and in a particularly preferred embodiment, this RF range should be about one inch. Although safeguards should and can be implemented in the event of crosstalk, such instances can be inconvenient in that they tend to require the check in, write and verify processes described herein to be repeated whenever communications between unwanted transceivers and/or unwanted player tracking instruments take place.

Figure 4A:
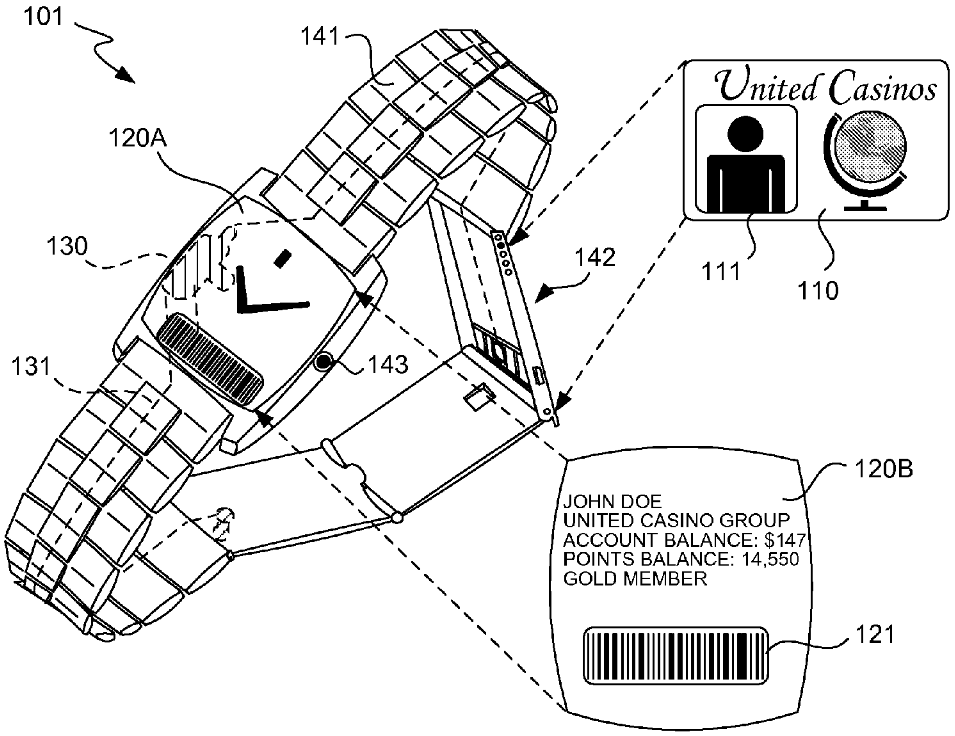
FIGS. 4A through 4C illustrate perspective views of alternative player tracking instruments having rewritable displays according to various alternative embodiments of the present invention.
Figure 4B:
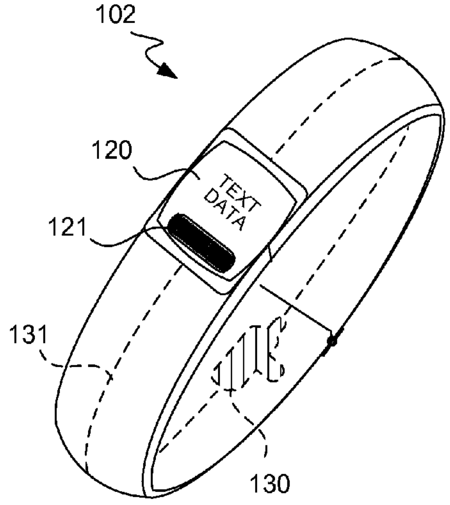
Figure 4C:
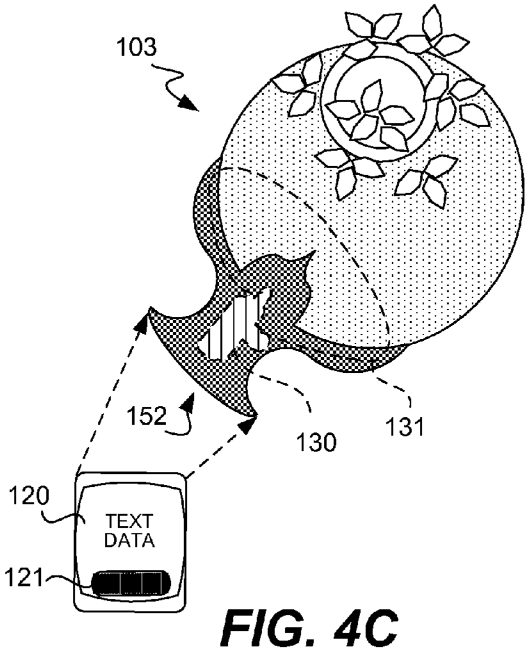

Continuing on to FIGS. 4A through 4C, several alternative player tracking instruments having rewritable displays according to various alternative embodiments of the present invention are illustrated in perspective view. It will be understood that each of these alternative player tracking instruments is similar in function to the card of FIGS. 3A and 3B, in that each contains an RFID tag adapted for communications with a transceiver, and that each contains at least one rewritable display. Referring first to FIG. 4A, a specialized player tracking instrument in the form of a wristwatch 101 is presented. Wristwatch 101 includes a face having a display 120A, a band 141, an interlocking back surface 142 and a button 143. As in the case of card 100, this wristwatch 101 can have an embedded RFIDIC 130 and antenna 131 to facilitate RF communications, and can depict at some location a general information area or label 110 that can include items such as a card affiliation, type, logo, mark, player picture 111, and the like, such as on back surface 142.

Button 143 can be used to toggle between different watch face displays, such as, for example, display 120A showing the time and bar code 121, and display 120B showing player account information and bar code 121. Of course, other types of displays can be substituted or added. As in the prior example, display 120B can comprise a number of items set forth in text and/or picture formats, such as to inform the player or others of information regarding the owner of the card, one or more monetary, credit or point balances attributable to the owner, and the status of the owner within the card issuer system, among others. Again, although a simple one dimensional bar code is illustrated, it will be readily appreciated that formats such as two dimensional bar codes may also be used. Other features and functions can be added as desired, and wristwatch 101 is particularly contemplated as one type of player tracking instrument that would be suitable for a battery and complex processor.

Referring next to FIG. 4B, a specialized player tracking instrument in the form of a bracelet 102 is presented. Bracelet 102 similarly includes a face having a rewritable display 120 with a rewritable barcode 121, and an embedded RFIDIC 130 and antenna 131 to facilitate RF communications. Although not illustrated, bracelet 102 might also contain a general information area or label at some location, similar to the label 110 of the foregoing embodiments. In FIG. 4C, a lucky trinket 103 is shown to similarly have a flattened surface 152 for a rewritable display 120 and a rewritable barcode 121, as well as an embedded RFIDIC 130 and antenna 131 to facilitate RF communications. Again, a general information area or label is not shown, but can be included if desired. As in the foregoing embodiment for a specialized player tracking card, each of wristwatch 101, bracelet 102 and lucky trinket 103 is adapted for RF communications with a transceiver at a gaming device, and each contains one or more rewritable displays on a substantially flat surface, such that these rewritable displays can be placed up against an input LCD of a gaming device.

Although different in appearance and potentially some features and functionality, it is contemplated that each of specialized player tracking instruments 101, 102, 103 and 104 might be usable in the same cashless gaming and/or player tracking system or systems. While some players might prefer the simplicity and likely cost of an enhanced card, such as card 101, others might prefer the style, feel or possible increased functionality of a wristwatch, bracelet, lucky trinket, or other such item as their own personal player tracking instrument. Although not shown above specifically, such items can include not only a player tracking card, wristwatch, bracelet or lucky trinket, but also a credit card, a debit card, a smart card, a magnetic striped card, a printed ticket, a room key, a keychain, a lucky token, or any other specially adapted portable wireless device, among other items. Fancier items might have an added cost to the player to compensate for the added cost of producing such items, while cards or other simpler devices might be assigned for a reduced cost or for free, as desired by a given casino or gaming operator.

One problem with using cards, wristwatches, bracelets, tokens, charms or other objects such as this is that there is always the potential for such objects to be the subject of theft or fraud, or to be freely transferred among players or others. While the majority of players may not wish for others to use such devices registered in their name and will thus take appropriate safeguards against improper transfers, there is a high potential for theft, fraud and unauthorized uses in a system utilizing such freely transferable devices. In addition, many casinos, gaming operators and other similar establishments would also prefer the option of having a system whereby such devices are not so freely transferable, for many obvious reasons. Accordingly, it might be desirable that some forms of these devices be more secure, or that other precautions be taken, such that there is a high likelihood that only the registered player or person for a given device can be using that device in an authorized manner.

One way of achieving such an objective is to require the item to be a securely worn device, such as a collar, wristwatch, wrist bracelet, ankle bracelet or the like, in a manner such that the device is disabled or deactivated when removed from the legitimate wearer. One instance of such an application can be found in, for example, commonly assigned and co-pending U.S. application Ser. No. 10/897,822 by Benbrahim, filed Jul. 22, 2004, and entitled "Remote Gaming Eligibility System and Method Using RFID Tags," which application is incorporated herein in its entirety and for all purposes. Another way of achieving such an objective is to require the use of a biometric identifier from the player in addition to the use of the assigned player tracking instrument. Examples of biometric information being used in conjunction with gaming machines and systems are described in commonly assigned and co-pending U.S. patent application Ser. No. 09/491,899 by Wells, et al. filed on Jan. 27, 2000, and entitled "Gaming Terminal and System with Biometric Identification;" Ser. No. 10/244,156, by Rowe, et al. filed Sep. 12, 2002, and entitled "Method and System for Verifying Entitlement to Play a Game Using a Biometric Identifier;" and Ser. No. 10/605,574 by Paulsen, et al. filed Oct. 9, 2003, and entitled "Universal Key Security Method and System," which applications are incorporated herein in their entirety and for all purposes as well. It is specifically contemplated that any or all parts of any of these devices or methods can be used in conjunction with the present invention to increase security and confidence levels within the system. Details of specific exemplary implementations are provided below.

Network and System Configurations

Figure 5:
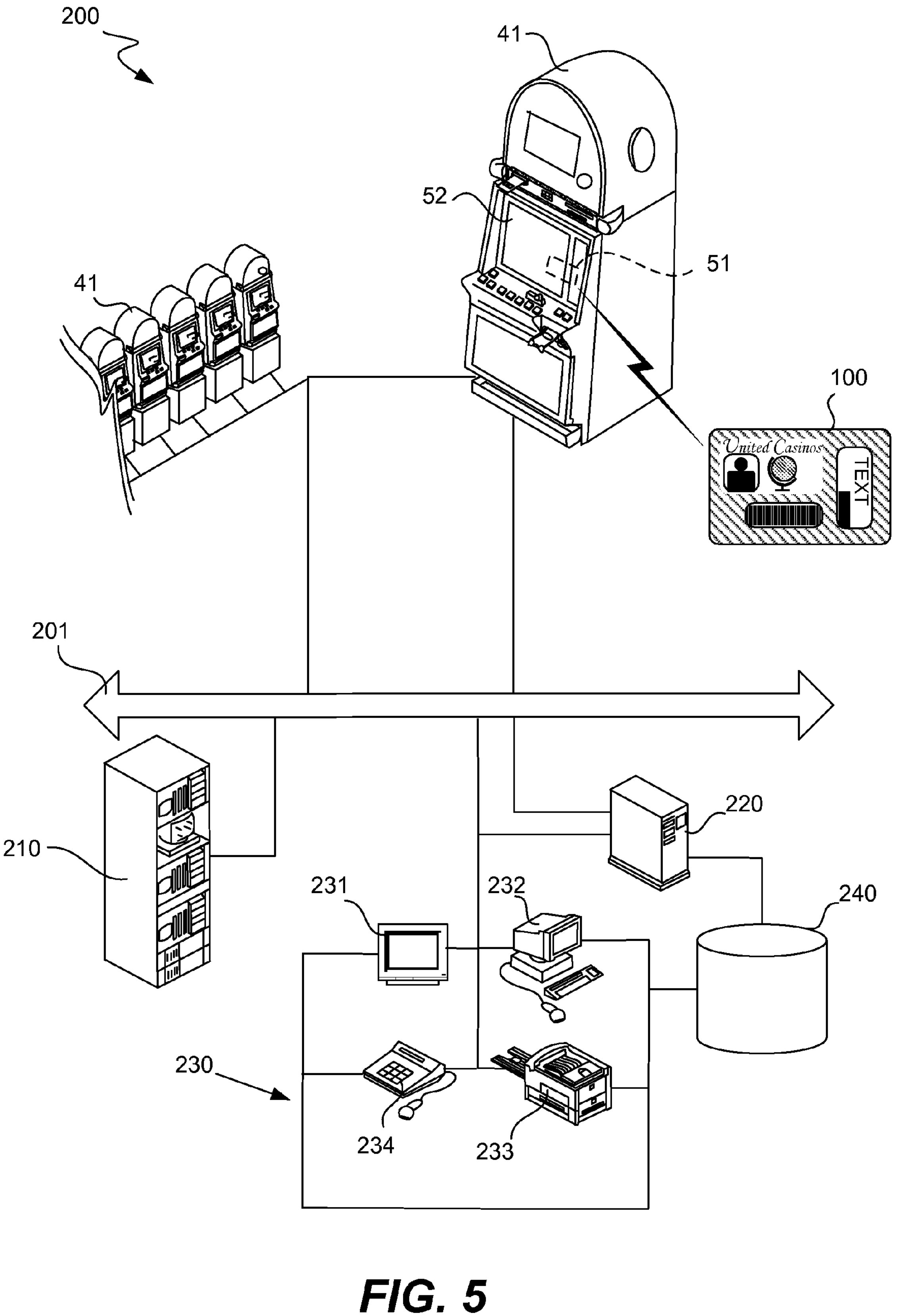
FIG. 5 illustrates a block diagram of an exemplary network infrastructure for providing a gaming system having improved automated cashless gaming and player tracking mechanisms such as those of FIGS. 2A through 4C according to one embodiment of the present invention.

Turning now to FIG. 5, an exemplary network infrastructure for providing a gaming system having improved automated cashless gaming and player tracking mechanisms such as those of FIGS. 2A through 4C according to one embodiment of the present invention is illustrated in a block diagram format. Gaming system 200 comprises one or more specialized gaming devices, a plurality of specialized player tracking devices, varied communication items, and a number of host-side components and devices adapted for use with a gaming environment and the inventive cashless gaming and player tracking methods and systems disclosed herein. As shown, one or more gaming machines 41 adapted for use as specialized gaming devices in gaming system 200 can be in a plurality of locations, such as in banks on a casino floor or standing alone at a smaller non-gaming establishment, as desired. Further, a plurality of specialized cards 100 or other such player tracking devices are also adapted for use in the system. Of course, other gaming devices such as gaming machine 40 and player tracking instruments 101, 102 and 103 may also be used in gaming system 200, as well as other similar devices not described in added detail herein.

Common bus 201 can connect one or more gaming machines or devices to a number of networked devices on the gaming system 200, such as, for example, a general-purpose server 210, one or more special-purpose servers 220, a sub-network of peripheral devices 230, and/or a database 240. Such a general-purpose server 210 may be already present within an establishment for one or more other purposes in lieu of or in addition to a cashless gaming and/or player tracking system. Functions for such a general-purpose server can include, both general and game specific accounting functions, payroll functions, general Internet and e-mail capabilities, switchboard communications, and reservations and other hotel and restaurant operations, as well as other assorted general establishment record keeping and operations. In some cases, cashless gaming and/or player tracking functions may also be associated with or performed by such a general-purpose server. For example, such a server may contain various programs related to player tracking operations, player account administration, remote game play administration and remote game player verification, and may also be linked to one or more gaming machines adapted for the transfer of remote funds for game play within an establishment, in some cases forming a network that includes all or substantially all of the specially adapted gaming devices or machines within the establishment. Communications can then be exchanged from each adapted gaming machine to one or more related programs or modules on the general-purpose server.

In a preferred embodiment, however, remote gaming system 200 contains one or more special-purpose servers that can be used for various functions relating to the provision of cashless gaming and player tracking under the present system. Such special-purpose servers can include, for example, a player verification server, a general game server, and/or a specialized accounting server, among others. Of course, these functions may all be combined onto a single server, such as player verification and specialized accounting server 220. Such additional special-purpose servers are desirable for a variety of reasons, such as, for example, to lessen the burden on an existing general-purpose server or to isolate or wall off some or all player identification information from the general-purpose server and thereby limit the possible modes of access to such remote player identification information.

Alternatively, remote gaming system 200 can be isolated from any other network within the establishment, such that a general-purpose server 210 is essentially impractical and unnecessary. Under either embodiment of an isolated or shared network, one or more of the special-purpose servers are preferably connected to sub-network 230. Peripheral devices in this sub-network may include, for example, one or more video displays 231, one or more user terminals 232, one or more printers 233, and one or more other digital input devices 234, such as a card reader or other security identifier, among others. Similarly, under either embodiment of an isolated or shared network, at least the specialized server 220 or another similar component within a general-purpose server 210 also preferably includes a connection to a remote player database or other suitable storage medium 240.

Database 240 is preferably adapted to store many or all files containing pertinent data or information for players registered within the gaming system, with this data or information being particularly relevant to player verification at a gaming machine, gaming terminal or other gaming device. Player files and other information on database 240 can be stored for backup purposes, and are preferably accessible to one or more system components, such as a specially adapted gaming machine 41, a general-purpose server 210, and/or a player verification server 220, as desired. Database 240 is also preferably accessible by one or more of the peripheral devices on sub-network 230 connected to remote player verification server 220, such that information or data specific to given players or transactions that are recorded on the database may be readily retrieved and reviewed at one or more of the peripheral devices, as desired. Although shown as directly connected to common bus 201, it is also contemplated that such a direct connection can be omitted and that only a direct connection to a player verification server or other similar analyzing device be present in the event that heightened security with respect to player files is desired.

While system 200 can be a system that is specially designed and created new for use in a casino or gaming establishment, it is also possible that many items be taken or adopted from an existing player tracking system. For example, system 200 could represent an existing player tracking system to which specialized player tracking devices and specialized gaming machines are added. Also, new functionality via software, hardware or otherwise can be provided to an existing database, 240, specialized server 220 and/or general server 210. In this manner, the methods and systems of the present invention may be practiced at reduced costs by gaming operators that already have existing gaming systems, such as a standard player tracking system, by simply modifying the existing system. Other modifications to an existing system may also be necessary, as might be readily appreciated.

Figure 6:
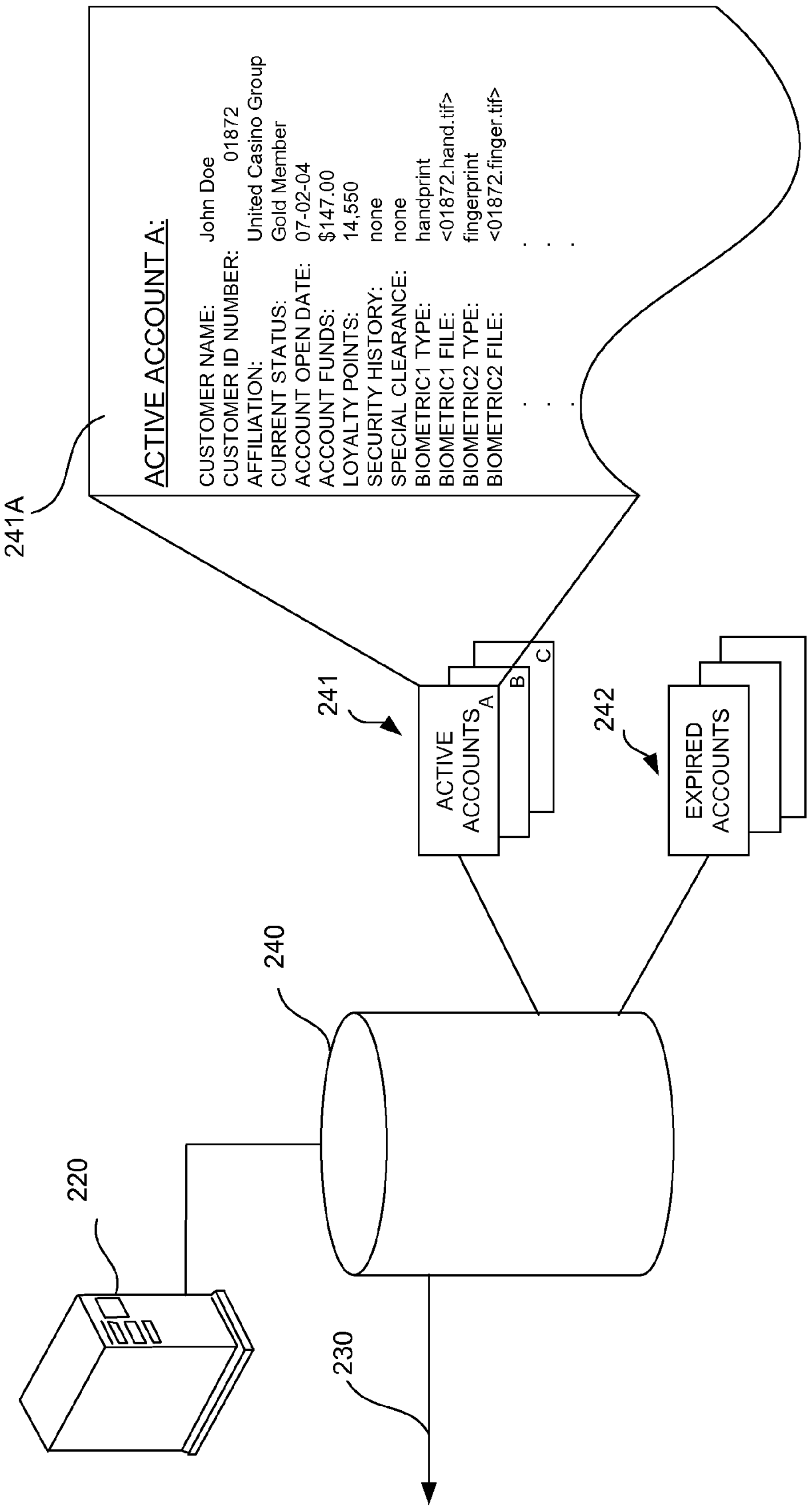
FIG. 6 illustrates a block diagram of an exemplary database containing files and associated data identifiers of various active and expired player accounts according to one embodiment of the present invention.

Continuing on to FIG. 6, an exemplary database containing files and associated data identifiers of various active and expired player accounts according to one embodiment of the present invention is illustrated. As similarly illustrated in FIG. 5, database 240 is accessible to one or more servers, preferably including at least a remote player verification and accounting server 220. Database 240 also preferably has a connection to a sub-network 230 of one or more peripheral devices. Contained within database 240 are numerous files or data sets with respect to many different past and present players registered within the gaming system, and preferably all such players are contained within database 240 or a collection of associated databases. Such files or data sets can be classified according to presently authorized and established active player files 241 and expired or banned player files 242, with such expired or banned player files including files for expired accounts, unregistered players, banned players, known or suspected system cheats or thieves, and/or otherwise unauthorized or untrustworthy players. Although not necessary, the existence and maintenance of expired or banned player files 242 can help to track fraudulent use of the system or the accounts of other players or improper or illegal attempts by unauthorized, underage or other undesirable players to play at a gaming machine, terminal or device, and thus aid in the denial of gaming activities to such individuals and/or reporting of such attempts.

Each file or data set 241, 242 preferably contains information regarding the status of, identity of, account balances, and any pertinent restrictions with respect to active and expired accounts, with database 240 preferably being adapted to store updated player information for each player over time as such information changes. Parameters for storing player information can vary widely, and are left up to the discretion of the system administrators. As shown in the illustrated example for established player file 241A, such information can include information for the player such as, for example, a player name, account number, affiliation, current status, registration date, monetary balance, loyalty point balance, and one or more player verification types and files, among others. Other possible player informational items can also be stored, and not every exemplary item listed here is necessary. Player verification types and files preferably include one or more forms of biometric information for the player, such as handprint, fingerprint or retinal data, a voice recording, or a visual image or short movie clip, among others.

Such information is preferably stored within a player file within the database, and can be retrieved and utilized by player verification server 220 and/or a player verification program on another system server or actual gaming machine, if applicable, in order to determine whether the identity of a potential player is correct as claimed. In the event that an established player defaults on a payment, accesses the gaming system from an improper location, attempts to aid in the access of an underage or otherwise unauthorized player, makes claims or excessive claims to fraudulent activity on his or her player account, or acts in other ways deemed to be improper, then the file for such a player be appropriately updated by a system administrator to reflect such information, add restrictions, or alternatively reclassify the file as a banned player file. In such cases, player information and biometric or other verification file types can be maintained within the database in order to utilize such information in the event that unauthorized access or fraudulent activity may be attempted at some point in the future by that individual.

Methods of Use

In general, the foregoing devices and systems can be utilized to benefit both gaming operators and players in creating an innovative, streamlined yet secure system for cashless gaming and player tracking activities. In this system, players may conveniently check in at a gaming device with their specialized player tracking instruments and be allowed access to funds from player accounts, have their player loyalty points tracked, or both. All of this is accomplished without requiring players to give up control of the player tracking instruments or cards, as all that players see is a need to hold their cards up to an input display for a limited time. In addition, some applications may require the player to provide a biometric identifier and/or a personal identification number ("PIN"), particularly in cases where there might be access to funds from remotely administered player accounts. Such a check in with a card or other player tracking instrument can occur before, during or after a gaming session, and preferably occurs multiple times in the event that funds are accessed for security reasons. Under such a system, convenience is maximized while invasiveness to player privacy is minimized, since players are no longer required to relinquish control of their cards by inserting them into a separate player tracking device during a gaming session. Accordingly, the likelihood of a player forgetting his or her card in such a device is minimized or eliminated altogether.

Although existing player accounts might be used, it is also possible for new player accounts to be created for such a system. It is also possible that players could play within such a system anonymously, such as by player tracking tickets, cards or instruments that are assigned without requiring player information, although it may not be possible to allow access to monetary accounts in such instances. In any event, it is preferable that a player account be established for a given player prior to play. An established player would then need to check in at a gaming machine at some point before, during or after a gaming session to receive player tracking credits or loyalty points, and would need to check in for an account funds transfer prior to receiving such a transfer. Although a private player PIN might be required, it may be more convenient to forego such an item in favor of requiring a player biometric, such as a handprint, thumbprint, iris scan, or the like.

Such a biometric could also be submitted through the input display, or could be provided via a separate dedicated biometric reading device. A currently provided biometric can be read and analyzed in comparison to a previously provided one for a given player that is already on file. Although not always perfect, such devices are known to be able to either confirm a no match between biometrics, or to narrow down the probability of the submitted biometric belonging to anyone other that the correct person to a 1 in 10,000 chance or better. Although it might not be possible to conclude definitively that the submitted biometric belongs to the right person, the odds may be sufficient for security purposes to conclude that access can be granted for such a "match" against a biometric on file. Because handprints tend to provide more data, and thus more possibilities for a non-match, the probability that is associated with this biometric tends to be on the order of 50,000 to 1 or better. It is thus thought that this particular biometric might be best to use with an input display.

Alternatively, separate biometric reading devices could be used that do not require submission through the input display. Although not illustrated, these devices could be within or about a specialized gaming machine or device, and could be in communication with the gaming machine, device or system to provide submitted biometric information for comparison and approval or denial of a submitting player. Of course, such biometric devices might also be equipped with a processor adapted for comparing biometrics, in which case an approval or denial of a submitting player could be submitted by the device itself. However, it is thought that such a biometric comparison should be made by a system server or within the specialized gaming machine or device for security purposes. In the case of a fingerprint, such a biometric player verifier can involve a fingerprint sensor. Such a device could be the MBF300 Fingerprint Sweepsensor™ manufactured by Fujitsu, Ltd. of Tokyo, Japan, or either of the EntrePad AES3400 or AES2500 Fingerprint Sensors manufactured by AuthenTec, Inc. of Melbourne, Fla., for example, although other brands and types of fingerprint sensors can be effectively utilized as well. It will be readily understood that other forms of biometric information can be used in place of or in conjunction with a fingerprint. Examples of such additional biometric features include handprints, which are similar in nature to fingerprints, facial features, for which facial recognition programs and hardware units are available, vocal tones and features, for which voice recognition programs and hardware units are available, and retinal features, for which retinal scan programs and hardware units are available. Any one of these or a variety of other biometric indicators can be used in conjunction with the provided player verification methods and systems to result in an application whereby some particular biometric feature of an established player is stored and utilized to compare to a subsequently read biometric feature of a current player to verify whether the current player is legitimate.

Although the use of a player biometric, PIN, or other verification item is preferred where monetary funds are to be transferred, it is possible to provide for such a monetary transfer without these items. In particular, there may be little need for requiring any added security measures where monetary funds or balances are only being transferred into an account or onto a storage device, such as a card. Such a funds transfer may be desired at the end of a gaming session resulting in a positive balance, after a huge win or jackpot, or in other circumstances. Although instances such as these would typically result in a coin or cash payout from a gaming machine, a hand pay by an attendant, or a printed ticket as a cash voucher, the methods and systems of the present invention also allow players to have the option of storing or transferring such funds electronically. Storing can involve placement of the funds onto a stored item, such as a specialized player tracking card or instrument, while transferring could involve placing the funds into a player account administered by the gaming operator, an independent financial institution, or some other entity.

Figure 7:
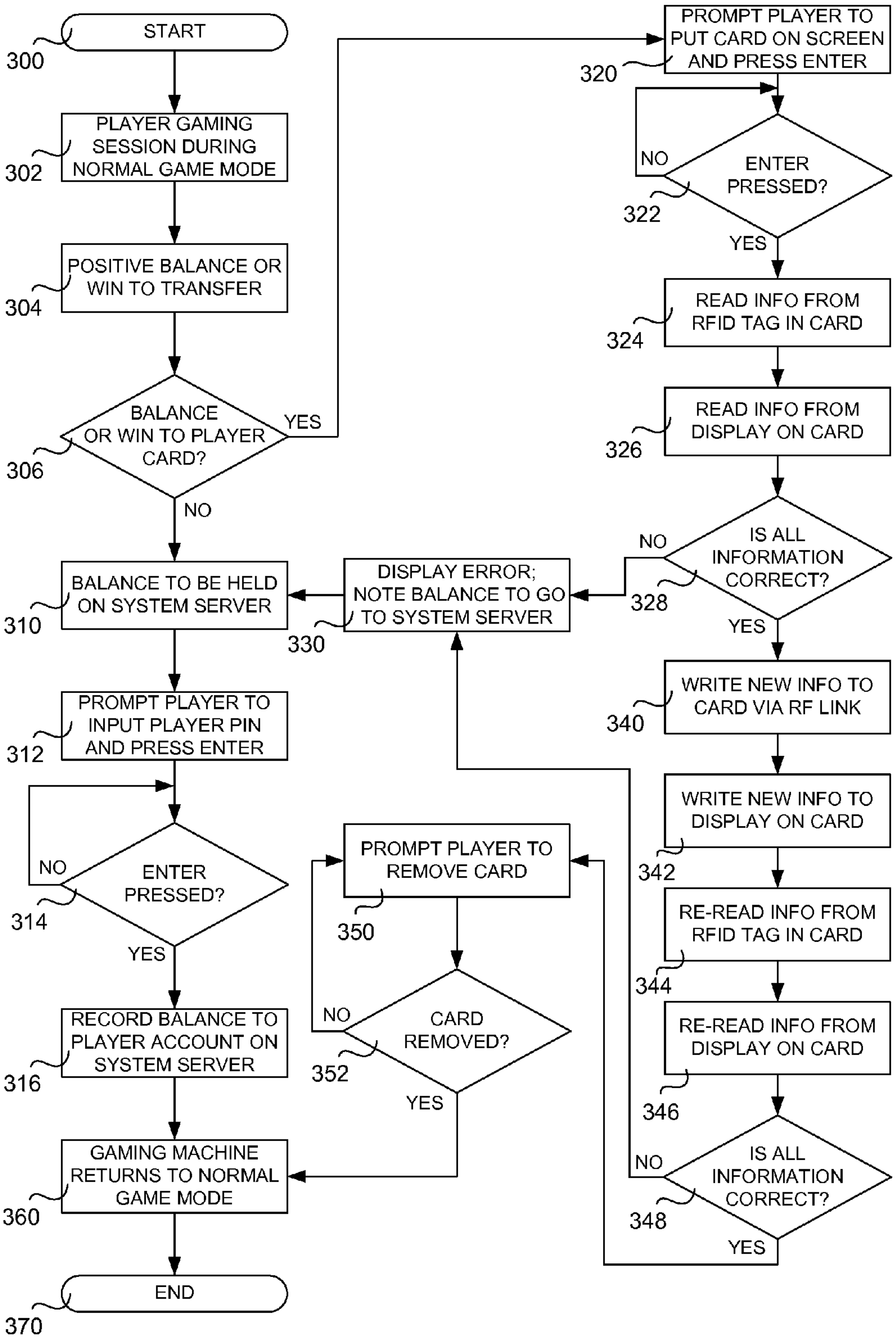
FIG. 7 illustrates a flowchart of one way to provide a positive monetary balance transfer from a gaming device to a player card or player account according to one embodiment of the present invention.

Referring now to FIG. 7, a flowchart of one way to provide a positive monetary balance transfer from a gaming device to a player card or player account according to one embodiment of the present invention is illustrated. After a start step 300, a player plays a gaming event or session at a gaming location during a normal game mode at process step 302. While such an event or session can be at a gaming machine, it will also be understood that this event or session could be at a table game, sports book, keno lounge, or other gaming location. At the end of the gaming event or session, a positive balance or win exists and is to be transferred at a process step 304. At this time an inquiry is made at a decision step 306 as to whether this balance is to be stored on a player card or instrument. Such an item can be any of items 100, 101, 102 or 103 discussed above, as well as any other suitable player tracking card or instrument. Although the term "card" is used throughout this description, it shall be known that this refers to any such instrument described above.

Continuing on, if the answer to the inquiry at decision step 306 is no, then the method continues to process step 310, where the balance is to be held in a player account, such as on the system server. Since step 310 is the default step in case of any error in the card storage process, the method from here will be continued below. If the answer to decision step 306 is yes, however, then the method moves on to process step 320, where the player is prompted to put his or her card against the input display screen and press an enter key or button. Of course, such a key or button may not be necessary in some instances. A following decision step 322 inquires as to whether enter has been pressed, with a loop being created until enter is pressed. Once the card has been placed and enter has been pressed, the method continues at process step 324, where information is read from the RFID tag in the card, and proceeds to step 326, where information is read from the rewritable display on the card. As will be readily apparent, steps 324 and 326 may also occur simultaneously or in reverse order. Although a PIN or player biometric is not thought to be necessary to transfer funds away from the gaming machine or device, such items could also be read here.

At this point, a decision step 328 inquires as to whether all information is correct. If the answer is no, then the method moves to process step 330, where an error message is displayed, and it is noted that the positive balance is to go to a player account, such as one on the system server. Alternatively, a player might opt for a cash payout from the machine or an attendant at this juncture. After step 330, the process reverts to step 310 where the balance is to be held on the system server. In considering whether all information is correct at step 328, many factors might be taken into account. It should be verified that the information from the RFID tag in the card matches up with the information on the rewritable display of the card, and that both of these items match up with information on the server for that player. If any item is incorrect, such as due to a rewritable display malfunction or damage, a faulty RFID tag, a flag on the player account, or the like, then the error can be displayed. Other informational items that can be accounted for at step 328 include biometric or PIN data as well, with errors or problems being handled similarly. In some instances, it may even be desirable to send an alert to casino personnel or security, such as where fraudulent activity is detected or suspected.

In the event that all information is correct at decision step 328, however, then the method moves on to process step 340, where new information is written to the card via the radio frequency link. This new information includes the storing of the positive balance onto the card, and may include other informational items as well, such as updated player loyalty credit information. After this new information is transferred to the card, then new information is written to the rewritable display of the card at a process step 342. At a following process step 344, information is reread from the RFID tag in the card, while at the next process step 346, information is reread from the rewritable display on the card. As in the foregoing steps above, steps 344 and 346 may also occur simultaneously or in reverse order. At a following decision step 348, another inquiry is made as to whether all information is correct. Presumably all of the reread information will reflect that which was just written to the card in previous step 340, and this is to be verified before proceeding.

If any errors or problems arise, however, then the method moves to step 330, which is described above. Should everything work correctly and all information checks out, then the player is prompted to remove his or her player tracking card at process step 350. At this point, the positive balance has been transferred to and stored on the player tracking card or instrument, the rewritable display or displays on the card have been updated accordingly, and all of this has been verified to be correct by the system. A following decision step 352 inquires as to whether the card has been removed, with a loop recurring until card removal. At that point, the method continues to process step 360, where the gaming machine or device returns to normal game mode, after which the method ends at an end step 370.

In the event that the player selects to transfer the positive balance to his or her account on the system server, or any error results in this outcome, then the method at step 310 continues to process step 312, where the player is prompted to input his or her PIN and press enter. Of course, this step might also include a prompt to the player to place his or her player tracking card up against the input display, or to provide any other indication as to which account the funds are to be transferred. Again, it is not thought that security is as critical in instances where funds are being transferred into a player account from a gaming machine or device. At a following decision step 314, an inquiry is made as to whether enter has been pressed, with a continuing loop occurring until this is accomplished. Again, an actual enter key or button may not be necessary, in which case step 314 simply represents an inquiry as to whether the appropriate player or account identification information has been provided. At the next process step 316, the positive balance is transferred to and recorded on the player account on the system server, after which the method moves on to step 360, where normal game mode is resumed, and then end step 370.

Figure 8:
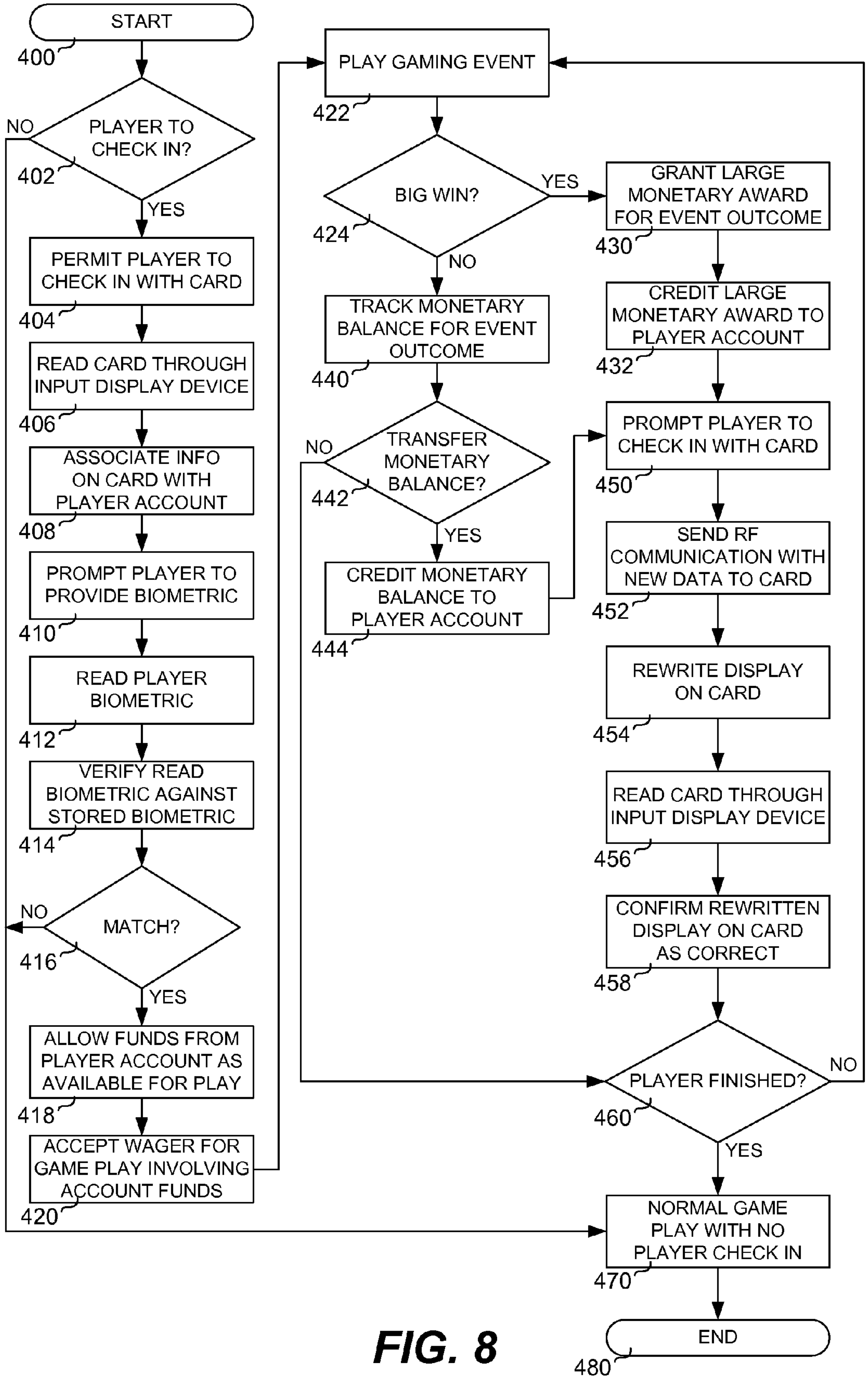
FIG. 8 illustrates a flowchart of one way of providing cashless gaming and player tracking at a given gaming location according to one embodiment of the present invention.

FIG. 8 illustrates a flowchart of one way of providing cashless gaming and player tracking at a given gaming location according to one embodiment of the present invention. While this flowchart may be comprehensive in some respects, it will be readily understood that not every step provided is necessary, that other steps might be included, and that the order of steps might be rearranged as desired by a given gaming operator. After an initial start step 400, an inquiry is made at a decision step 402 as to whether a player at the gaming location is to check in with his or her player tracking card or instrument. As in the foregoing example, this may be any of the cards or instruments described above, or may be any other suitable instrument, with the term "card" as used herein being intended to refer to all such instruments. If the answer to this inquiry is no, then the method essentially short-circuits by moving to process step 470, where normal game play with no player check in commences, after which the process ends at end step 480.

If the player is to check in, however, then the method continues to process step 404, where the player is permitted to check in with his or her card. As in the foregoing example, this involves the player holding the card up against a provided input display. In both this and the foregoing example, this can be done in response to a prompt on the display itself, such as text language and/or an outlined box or region indicating where the card is to be placed. In one embodiment, a card sized box can be graphically represented on the screen with the text "Place Card Here" being inside the graphical box. Preferably, an RFID transceiver inside the gaming machine is located in close proximity to where this graphical box and text is programmed to be located on the input display, such that communications from the transceiver to the card can occur while the card is being read through the input display. This would then result in a feedback loop from the transceiver to the card to the input display to the gaming machine MGC and back to the transceiver, as will be readily appreciated.

As the player holds, clips or otherwise places his or her card against the input display screen, the card is then read through the screen at process step 406. This card reading step may also include establishing an RF link with the card and reading information from the card RFID via this link, if desired. At a following process step 408, the information read from the card is associated with a player account. In a preferred embodiment, this player account is one that is kept and/or tracked on a system server, such as that which is described above. At a subsequent process step 410, the player is prompted to provide a biometric for verification purposes. As in the above examples, a PIN or other security measure may be substituted for such a provided biometric, if desired. As also discussed above, this player biometric may be provided through the input display itself, or through a separately provided biometric reading device. If provided through the input display, this can be done in the same region through which the player tracking card is read. Alternatively, the player biometric can be read through a different region of the input display, either after the player tracking card is read, or simultaneously. In such an instance, there might be a separate box or region graphically represented on the screen with text such as "Place Right Hand Here" being inside the graphical box.

Again, this player biometric can be a handprint, a fingerprint, an iris scan, or the like. At the next process step 412, the player biometric is read, and at the next process step 414, a verification is made of the read biometric versus a stored biometric for that player. At a following decision step 416, an inquiry is made as to whether there is a match between the newly read and stored biometrics for the player. In the event that there is no match, then the method continues to process step 470, where normal game play commences. In the event that there is a match, then the method moves on to process step 418, where funds from a player account are made available for play. As noted above, a "match" does not need to be a conclusive decision that the present player is the exact person for which a biometric is on file, since such a decision may be difficult to achieve. Rather, a "match" indicates that the present player cannot be rejected, which would likely occur in only 1 of 10,000 or more cases if that person really was not who he or she was claiming to be. Such chances may be adequate for security purposes, and can be increased with better technologies and in combination with other devices, such as a PIN, if desired.

After funds have been made available at step 418, a transfer or partial transfer of funds might be made. At a subsequent process step 420, a wager is then accepted from the player, with the wager involving at least some of the transferred funds from the player account. In one embodiment, the transfer from the player account may be made for purposes of placing a single bet or wager with all of the transferred funds, such as at a sports book. In another embodiment, the transfer from the player account may be made for providing an account balance for a gaming session, such as at a gaming machine or table game. In the case of such a gaming session, it is thought that one transfer of a set amount many times larger that the size of the wagers to be made is preferable to repeated funds transfers before each bet at the gaming machine or gaming table. However, it is also possible to utilize a system where each wager must be individually transferred from the player account.

After a wager involving at least a portion of the transferred funds is made on a gaming event, then the gaming event is played at a process step 422. After this gaming event is played, an inquiry is made at a decision step 424 as to whether a big win or jackpot has been obtained. If so, then the method moves to process step 430, where a large monetary award is granted corresponding to the event outcome. In many instances, such a large award may be bigger than that which can be paid at the gaming location, particularly in cases of gaming machine jackpots. Typically, such large awards are jackpots require a hand pay of cash or a check by casino or gaming establishment personnel. Under the present invention, however, such a need can be obviated by permitting the player to elect to have the award transferred or credited to his or her player account on the server or at a remote financial institution. In any event, this crediting can be accomplished at a following process step 432, after which the player is prompted to check in with his or her player tracking card at process step 450, the following steps for which are described in detail below.

If the inquiry at decision step 424 is no, however, then the method moves on to process step 440, where a monetary balance is tracked according to the outcome of the gaming event. Such an outcome could be a loss, or it could be a relatively smaller win, for which a player would not ordinarily alter or end his or her gaming session, but would rather tend to continue to play additional gaming events. Such instances could include, for example, a player playing at a gaming machine or a blackjack table, among others. In addition, while the adjustment of this monetary balance might include an electronic adjustment of a meter, such as on a gaming machine, this adjustment might also involve the use of physical chips or markers, such as at a table game. In fact, it is contemplated that the present invention could be used to enable a player to access his or her player account funds for purchasing chips or markers at a table game having in input display adapted for reading and communicating with a player tracking card or instrument as described above. In such cases, cash outs of chips or markers might also be accomplished by the same means, with the monetary funds or credits being stored on a player card or account.

After the monetary balance for the player is adjusted at process step 440, an inquiry is made at a decision step 442 as to whether the player would like to transfer some or all of the current monetary balance. Should the player not desire a balance transfer at step 442, then the method moves to decision step 460, where an inquiry is made as to whether the player is finished with the present gaming session. If not, then the method reverts to process step 422, where another gaming event is played. If the player is finished at step 460 though, then the method continues to process step 470 for normal game play, at which point it ends at end step 480.

If the answer to decision step 442 is yes, then the method continues to process step 444, where the monetary balance or portion thereof is credited to the player account. This can be done on a player account on the server, to a remote financial institution, or can be stored on the card, various steps for which are described above. After this crediting or storing step, the process continues to step 450, where the player is prompted to check in again with his or her card. Of course, if the monetary balance is to be stored on the card, then this would need to take place before the crediting step 444, as will be readily appreciated. As the player checks in with his or her player tracking card at step 450, RF communications with new data are sent to the card from the transceiver within or about the gaming machine or device at a process step 452, as described above. This new data can include the new monetary account balance and a new player tracking points or loyalty credits balance. As also described above, one or more rewritable displays on the card are rewritten according to this new data at a process step 454. These displays are rewritten to reflect changed information, such as a new monetary account balance and a new player tracking points or loyalty credits balance, among others.

As also noted above, a feedback loop can be created while the player holds or places his or her card against the input display screen, such that the rewritten display on the card can be read through the input display at a following process step 456. While the card is against the screen, a confirmation can be made that the newly rewritten display on the card is correct at a process step 458. If there is any error, an appropriate error message or other corrective action can be taken. In one embodiment such a corrective action can be a reattempt to send and rewrite the data. This might be especially appropriate in the event that crosstalk, improper card placement or other factors have cause a poor or failed data transmission and rewrite. In such an event, it may be desirable to present an informative message to the player, such as a notice that the card communication and update has failed, and that the card should continue to be placed against the input display for another attempt. In the event that further attempts also fail, a final error message instructing the player to see an attendant might occur.

After the rewritten display on the card has been confirmed to be correct according to the player information on the gaming machine and/or the gaming system server, the process then continues to decision step 460, where an inquiry is made as to whether the player is finished. Typically, after a balance transfer, a player would be finished with the present gaming session, at which point the gaming machine or device would proceed to normal game play or operation at a process step 470, at which point the method would end at end step 480. If the player only desired a transfer during a gaming session and wished to continue, however, then the method would revert to process step 422, where another gaming event would be played. As it will be readily appreciated, player tracking points or loyalty credits can be awarded, tracked and recorded during this entire process while the player is logged in. Details of awarding, tracking and recording such points or credits are known in the art, and any system, table or schedule for doing so may be used in the foregoing process. In one embodiment, an update of player tracking points or credits can be made at process step 440 whenever the monetary balance is updated. In another embodiment, gaming session data can be tracked and points can be awarded at process step 470 when the player is done with his or her gaming session.

As noted above, many other devices, steps and requirements can be added to this illustrated method, as this merely represents one example of how the present invention might be practiced. For example, the requirement of having a player check in with his or her specialized player tracking card or instrument might occur at the beginning of a gaming event or session, during the event or session, at the end of the event or session, or any combination thereof, as required by a given casino or gaming operator. Such check ins may or may not also include the provision of additional verifying information, such as a PIN, player biometric, or the like. While such added information may not be necessary where only player tracking information and points or loyalty credits are concerned, additional security may be desired for cashless gaming events involving the transfer or availability of remotely held funds.

In yet another embodiment of the present invention, it is specifically contemplated that the steps of obtaining and verifying information such as a biometric or PIN, and permitting a given gaming event or session to continue are repeated even after the gaming event or session has already commenced. Of course, such an embodiment may be used in combination with one or more of the previously discussed preferred embodiments. The repetition of these steps is particularly useful in preventing or at least limiting the ability of a thief or con artist from stealing account information or access from unwitting players, or from allowing a legitimate player to hand off control of a signed in account on a gaming machine or terminal to an underage or otherwise unauthorized player. The repetition of these steps can result in a particular gaming event or session being terminated if it is determined that an inappropriate use or activity has occurred or is in the process of taking place.

While the repeated verification of a player can take place at regularly timed intervals, such as every 5 to 10 minutes, for example, it is thought that re-verification at random intervals can result in stricter adherence to proper play by the registered player, as it would then be unknown as to when a re-verification might occur next. Alternatively, it is possible that the repetition of obtaining personal information and verifying the player can be continuous. For example, the player card can be clipped or held to a region of the LCD input screen at all times. In such a situation, it could be very difficult for a player or group of players to defraud the system by allowing account access to an unauthorized player.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of facilitating wagers on a gaming event, said method comprising:

permitting a player to check in with a player tracking instrument assigned to said player;

reading said player tracking instrument through a display device having a display and read region, wherein said display device is adapted both to display gaming related information and to read player related information through said display and read region;

accepting a wager from said player regarding said gaming event; and providing the result of said gaming event to said player, wherein said display device comprises an LCD panel having a built-in scanner, said LCD panel being adapted to display images thereupon and also read images of objects placed thereto.

2. The method of claim 1, wherein said gaming event is played on a wager-based gaming machine.

3. The method of claim 1, wherein said providing step includes displaying gaming related information through said display and read region of said display.

4. The method of claim 1, wherein said player tracking instrument contains a radio frequency identification tag therein and a rewritable display thereupon.

5. The method of claim 4, wherein said rewritable display of said player tracking instrument comprises one or more elements selected from the group consisting of electronic ink and organic light emitting diodes.

6. The method of claim 1, further including the steps of:

prompting said player to check in again with said player tracking instrument;

sending a radio frequency communication to said player tracking instrument;

rewriting at least a portion of a rewritable display on said player tracking instrument in response to said radio frequency communication;

reading said rewritten portion of said rewritable display through said display and read region of said display; and confirming that said rewritten portion of said rewritable display is correct in accordance with said radio frequency communication.

7. The method of claim 1, further including the steps of:

prompting said player to provide a player specific biometric identifier at said display device;

reading said provided biometric identifier; and verifying that said biometric identifier corresponds to biometric information previously stored for said player.

8. The method of claim 1, wherein said player tracking device is associated with a remotely administered account assigned to said player, and further including the steps of:

transferring funds from said remotely administered account; and crediting said transferred funds to said player for wagering on said gaming event.

9. The method of claim 1, further including the steps of:

playing one or more additional gaming events;

tracking a monetary balance for said player with respect to the outcomes of said gaming event and said one or more additional gaming events; and crediting at least a portion of said monetary balance to an account assigned to said player.

10. A gaming system for use in conjunction with gaming events involving the placement of wagers, the play of games, and the grant of monetary awards based upon the outcomes of the games, the gaming system comprising:

a computer server adapted to facilitate the tracking of information associated with a plurality of said gaming events;

a gaming device in communication with said computer server and adapted for use in association with one or more of said plurality of gaming events, wherein said gaming device includes a display panel having a display and read region adapted both to display gaming related information therethrough and to read player related information therethrough;

wherein said display panel comprises an LCD panel having a built-in scanner, said LCD panel being adapted to display images thereupon and also read images of objects placed thereto; and a plurality of player tracking instruments for use by one or more players within said gaming system, wherein at least one of said plurality of player tracking instruments contains a first communication component adapted for communications using a first mode of communication and a second communication component adapted for communications using a second mode of communication, said second mode of communication being separate and distinct from said first mode of communication, wherein said second communication component includes a rewritable component.

11. The gaming system of claim 10, wherein said first communication component comprises a radio frequency identification tag.

12. The gaming system of claim 10, wherein said second communication component comprises a rewritable display.

13. The gaming system of claim 10, further comprising:

a database in communication with said computer server, said database containing data with respect to a plurality of players.

14. The gaming system of claim 10, wherein said at least one player tracking instrument comprises a storage unit adapted to store information regarding a specific player account thereupon.

15. The gaming system of claim 10, wherein said at least one player tracking instrument comprises a player tracking card.

16. The gaming system of claim 10, wherein said at least one player tracking instrument is selected from the group consisting of a credit card, a debit card, a smart card, a magnetic striped card, a printed ticket, a room key, a keychain, a bracelet, a wristwatch, a lucky token and a portable wireless device.

17. A gaming machine or terminal adapted for accepting wagers, playing games thereupon and granting monetary awards, comprising:

an external cabinet defining an interior region of said electronic gaming machine, said external cabinet adapted to house a plurality of gaming machine components within or about said interior region; and at least one display device located within or about said external cabinet, said at least one display device having a display and read region adapted to display gaming related information therethrough and to scan player related information from a substantially flat surface of a player tracking instrument therethrough, wherein said at least one display device comprises an LCD panel having a built-in scanner, said LCD panel being adapted to display images thereupon and also read images of objects placed thereto.

18. The gaming machine or terminal of claim 17, further including:

a radio frequency communication device located within or about said external cabinet, said radio frequency communication device being adapted to communicate via radio frequency waves with said player tracking instrument.

* * * * *